(12) United States Patent
Parron et al.

(10) Patent No.: US 11,419,001 B2
(45) Date of Patent: Aug. 16, 2022

(54) CRITICAL DATA HANDLING FOR VIDEO AND OTHER APPLICATIONS

(71) Applicant: Apple Inc., Cupertino, CA (US)

(72) Inventors: Jerome Parron, Fuerth (DE); Thomas Luetzenkirchen, Taufkirchen (DE); Marta Tarradell Martinez, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 16/638,296

(22) PCT Filed: Aug. 10, 2018

(86) PCT No.: PCT/US2018/046340
§ 371 (c)(1),
(2) Date: Feb. 11, 2020

(87) PCT Pub. No.: WO2019/033049
PCT Pub. Date: Feb. 14, 2019

(65) Prior Publication Data
US 2020/0229026 A1 Jul. 16, 2020

Related U.S. Application Data

(60) Provisional application No. 62/544,626, filed on Aug. 11, 2017.

(51) Int. Cl.
*H04W 28/02* (2009.01)
*H04W 80/02* (2009.01)
(Continued)

(52) U.S. Cl.
CPC ....... *H04W 28/0278* (2013.01); *H04W 28/06* (2013.01); *H04W 72/1284* (2013.01);
(Continued)

(58) Field of Classification Search
CPC . H04W 28/0278; H04W 28/06; H04W 76/15; H04W 72/1284; H04W 72/14; H04W 80/02
(Continued)

(56) References Cited

U.S. PATENT DOCUMENTS

2008/0250294 A1  10/2008  Ngo et al.
2015/0173099 A1*  6/2015  Sun .................. H04L 1/1854
                                                370/336
(Continued)

FOREIGN PATENT DOCUMENTS

EP         2584466 A1    4/2013
WO      2016/144082 A1   9/2016

OTHER PUBLICATIONS

Supplementary European Search Report dated Feb. 12, 2021 for European Application No. EP18844985.
(Continued)

*Primary Examiner* — Candal Elpenord
(74) *Attorney, Agent, or Firm* — Eschweiler & Potashnik, LLC

(57) ABSTRACT

Techniques for indicating the presence of critical data at user equipment (UE) in an Radio Access Network (RAN) are described. According to various such techniques, a UE can identify critical data and send an information element including an indication of the critical data to a node (NB) of the RAN. The NB can then modify a schedule or handling the data communicated between the UE and the NB.

25 Claims, 17 Drawing Sheets

(51) Int. Cl.
*H04W 72/12* (2009.01)
*H04W 28/06* (2009.01)
*H04W 76/15* (2018.01)
*H04W 72/14* (2009.01)

(52) U.S. Cl.
CPC ........... *H04W 72/14* (2013.01); *H04W 76/15* (2018.02); *H04W 80/02* (2013.01)

(58) Field of Classification Search
USPC ................................................ 370/329–330
See application file for complete search history.

(56) References Cited

U.S. PATENT DOCUMENTS

| | | | |
|---|---|---|---|
| 2017/0111927 A1* | 4/2017 | Kim | H04W 72/1284 |
| 2018/0192434 A1 | 7/2018 | Lee | |
| 2018/0262311 A1* | 9/2018 | Wang | H04W 72/14 |
| 2018/0368167 A1* | 12/2018 | Kim | H04W 28/0278 |
| 2020/0178113 A1* | 6/2020 | Jin | H04W 28/0268 |
| 2020/0236701 A1* | 7/2020 | Kim | H04W 72/0446 |

OTHER PUBLICATIONS

Huawei et al.; "UL Scheduling Enhancement in NR"; 3GPP Draft; R2-1700175; Spokane, Washington; Jan. 19, 2017.
International Preliminary Report on Patentability dated Feb. 20, 2020 for International Application No. PCT/US2018/046340.
International Search Report dated Dec. 27, 2018 for International Application No. PCT/US2018/046340.
"Impact analysis of critical data discard on UL Video transmission." Source: Intel Corporation. Agenda Item: 8.16. 3GPP TSG RAN WG2 Meeting #95bis, Kaohsiung, Oct. 10-14, 2016. R2-166583. 6 pages.
"Video signalling related enhancements." Source: Intel Corporation. Agenda Item: 8.3.3. 3GPP TSG-RAN WG2 Meeting #95, Gothenburg, Sweden, Aug. 22-26, 2016. R2-164992. 5 pages.
3GPP TS 36.321 V14.3.0; "3rd Generation Partnership Project; Technical Specification Group Radio Access Network; Evolved Universal Terrestrial Radio Access (E-UTRA); Medium Access Control (MAC) protocol specification (Release 14)"; Jun. 2017; pp. 2-107.
3GPP TS 36.322 V14.0.0; "3rd Generation Partnership Project; Technical Specification Group Radio Access Network; Evolved Universal Terrestrial Radio Access (E-UTRA); Radio Link Control (RLC) protocol specification (Release 14)"; Mar. 2017; pp. 2-45.
3GPP TS 36.323 V14.3.0; "3rd Generation Partnership Project; Technical Specification Group Radio Access Network; Evolved Universal Terrestrial Radio Access (E-UTRA); Packet Data Convergence Protocol (PDCP) specification; (Release 14)"; Jun. 2017; pp. 2-43.
3GPP TS 37.324 V0.1.0; "3rd Generation Partnership Project; Technical Specification Group Radio Access Network; E-UTRA and NR; Service Data Adaptation Protocol (SDAP) specification; (Release 15)"; Jul. 2017; pp. 2-14.
3GPP TS 38.321 V0.2.0; "3rd Generation Partnership Project; Technical Specification Group Radio Access Network NR; Medium Access Control (MAC) protocol specification; (Release 15)"; Aug. 2017; pp. 2-36.
3GPP TS 38.322 V0.2.0; "3rd Generation Partnership Project; Technical Specification Group Radio Access Network; NR; Radio Link Control (RLC) protocol specification; (Release 15)"; Jul. 2017; pp. 2-30.
3GPP TS 38.323 V0.2.0; "3rd Generation Partnership Project; Technical Specification Group Radio Access Network; NR; Packet Data Convergence Protocol (PDCP) specification; (Release 15)"; Aug. 2017; pp. 2-29.

* cited by examiner

CRITICAL DATA HANDLING FOR VIDEO AND OTHER APPLICATIONS

RELATED CASE

This application is a National Phase entry application of International Patent Application No. PCT/US2018/046340 filed Aug. 10, 2018, which claims priority to U.S. Provisional Patent Application No. 62/544,626, filed Aug. 11, 2017, entitled "CRITICAL DATA HANDLING ENHANCEMENTS FOR VIDEO AND OTHER APPLICATIONS" and is hereby incorporated by reference in its entirety.

TECHNICAL FIELD

Embodiments herein generally relate to communications between devices in broadband wireless communications networks.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. As the number and type of content communicated over wireless channels increases, the difficulty in handling the associated data and prioritizing the communication also increases.

DETAILED DESCRIPTION

Figure 1:
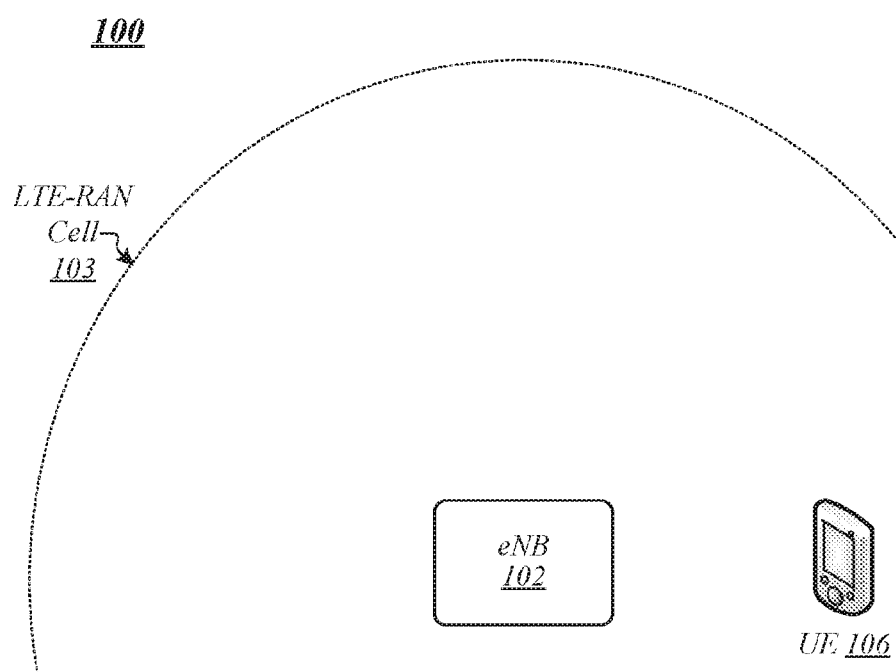
FIG. 1 illustrates an embodiment of a first operating environment.

A user equipment (UE) communicates with a node (or nodes) in a radio access network (RAN) cell. The present disclosure provides that the UE can notify the node when uplink (UL) critical data is stored within a given data radio bearer (DRB) to alert the node that this UE may benefit from different scheduling or handling. For example, the UE may benefit from having more and/or larger grants, from having additional protection for the UL grant (e.g. lower modulation coding scheme (MCS), additional redundancy, different maximum number of retransmission or increase the number of repetitions required when operating in coverage enhancement (CE) mode), or the like.

In general, the present disclosure provides a UE that is aware of the uplink (UL) critical data within the DRB of a user. For example, the UE access stratum (AS) can be aware of the UL critical data with the DRB. The UE can provide different handling and/or prioritization of the UL critical data within DRB.

The present disclosure further provides a RAN cell node that is aware of UL critical data within DRB of the user to prioritize scheduling and/or handling of the data within the DRB of the user. As such, degradation of the communication (e.g., conversational video, or the like) of the UE can be minimized.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), 3GPP LTE-Advanced (LTE-A), 3GPP LTE-Advanced Pro, and/or 3GPP fifth generation (5G)/new radio (NR) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth). High Performance Radio Metropolitan Area Network (HT-PERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, IEEE 802.11ax, IEEE 802.11ay, and/or IEEE 802.11y standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any revisions, progeny, and/or variants of any of the above. The embodiments are not limited to these examples.

Figure 2:
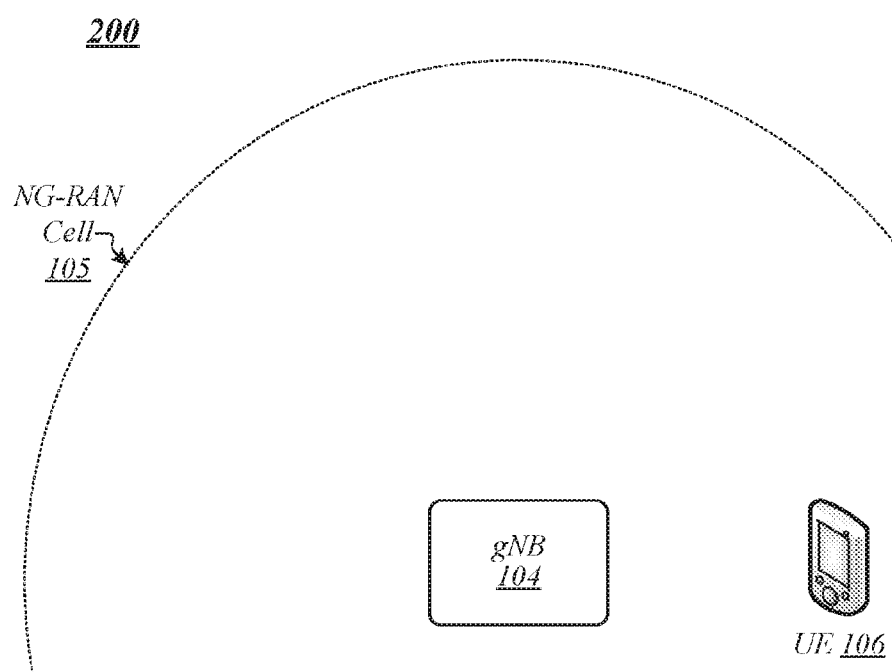
FIG. 2 illustrates a first embodiment of an RRC message structure.

FIGS. 1 and 2 illustrate examples of operating environments 100 and 200, respectively. Operating environments 100 and 200 may be representative of various embodiments. In FIG. 1, operating environment 100 depicts an evolved node B (eNB) 102 that serves an LTE (LTE) radio access network (RAN) cell 103. LTE-RAN cell 103 may generally be representative of a radio access network cell within which wireless communications are performed in accordance with 3rd Generation Partnership Project (3GPP) Long-Term Evolution (LTE) radio interface protocols.

In FIG. 2, operating environment 200 depicts a next generation node B (gNB) 104, which serves a next generation RAN (NG-RAN) cell 105. NG-RAN cell 105 may generally be representative of a radio access network cell within which wireless communications are performed in accordance with 3rd Generation Partnership Project (3GPP) fifth generation (5G) new radio (NR) radio interface protocols. In some examples, the NG-RAN cell 105 may be a small cell within the LTE-RAN cell 103. Examples are not limited in this context.

Operating environments 100 and 200 each depict user equipment (UE) 106 located within LTE-RAN cell 103 and NG-RAN cell 105, respectively. In either of operating environments 100 or 200, UE 106 may wirelessly communicate with eNB 102 or gNB 104 according to such protocols in conjunction with establishing and utilizing wireless data connectivity via either eNB 102 or gNB 104. Wireless communication between UE 106 and eNB 102 or gNB 104 can be established via an RRC framework.

During operation, UE 106 can determine whether critical data exists and provide different handling and/or prioritization for the determined critical data. Furthermore, the UE 106 can alert the eNB 102 or gNB 104 of the determined critical data. The eNB 102 or gNB 104 can prioritize scheduling and/or handling of the critical data. Thus, degradation of UE 106 communication can be minimized.

The disclosure now turns to providing a number of examples of information that can be carried, provided, or otherwise made available for UE 106 to indicate critical data. Such indications can be provided to the network (e.g., to eNB 102, to gNB 104, or the like) or utilized by UE 106. These indications can be used to enhance the handling of the critical data (e.g., change handling and/or scheduling, or the like) to minimize or reduce degradation of communication associated with the critical data. It is important to highlight that there are multiple reason why data may be categorized as critical. For example, some packets within video over LTE (ViLTE) traffic can be designated as critical. As another example, some packets within voice over LTE (VoLTE) traffic can be designated as critical, such as, packets carrying uncompressed headers for robust header compression (ROHC) data. As a further example, signaling message sent by upper layers can be designated as critical.

It is important to note, that the information used to indicate critical data can be provided using a number of different mechanisms. Such mechanisms can depend upon where the data originates. As another example, such mechanisms can depend upon which entity within the UE (e.g., MAC layer, PDCP layer, RLC layer, SDAP layer, or the like) is providing the information. Example of such mechanisms are provided below, following the examples of illustrative information that can be categorized as critical.

As noted, critical data can be determined based on a number of factors. Examples of information that can be provided to allow UE 106, eNB 102, or gNB 104 to determine whether data is critical are provided here.

As a first example, provided information could indicate that a critical packet data convergence protocol (PDCP) service data unit (SDU) is present in the PDCP buffer queue, that critical data is in the buffer, or that this packet included critical data. With some examples, this information can be indicated with 1 bit (e.g., 0—no critical data, 1—critical data, or the like).

As a second example, provided information could indicate that under the latest UL grant allocation and periodicity, critical PDCP SDUs will be discarded before being transmitted, or that critical data stored in a buffer of UE 106 would be discarded before being transmitted. With some examples, this information can be indicated with 1 bit (e.g., 0—critical data not discarded, 1—critical data discarded, or the like).

As a third example, provided information could indicate that a non-critical PDCP SDU preceding the $1^{st}$ critical PDCP SDU has been flushed, or that non-critical data preceding the $1^{st}$ critical data has been flushed or discarded. With some examples, this information can be indicated with 1 bit (e.g., 0—non-critical data prior to critical data discarded, 1—non-critical data prior to critical data not discarded, or the like). In some examples, this information can be indicated with n>=1 bits, where the indication can include the size of the non-critical data preceding the $1^{st}$ critical PDCP SDU that has been flushed.

As a fourth example, provided information could indicate that critical PDCP SDUs are not present in the PDCP buffer queue, or that critical data is not in the buffer, or that this packet is not critical. With some examples, this information can be indicated with 1 bit (e.g., 0—critical data not present, 1—critical data present, or the like).

As a fifth example, provided information could indicate the characteristics of the data stored in the buffer, or characteristics of every packet associated with the corresponding information. With some embodiments, this information can be indicated with 2 bits. For example:

[00] could indicate no critical data, or critical data ends;
[01] could indicate critical data starts, $1^{st}$ packet of critical data, or critical data in buffer is below certain threshold;
[10] could indicate critical data ongoing, there is still not critical data, or critical data in buffer is above certain threshold;
[11] reserved.

As a sixth example, provided information could indicate a logical channel ID (LCID) of the video bearer, another bearer, or a flow that may be carrying critical data. Note that it is possible that all data sent is critical, as well as, that only some of the data sent may be critical data. With some embodiments, this information can be indicated with 5 bits, or with n>=1 bit.

As a seventh example, provided information could indicate the size of the buffer of the number of critical packets, which could have only the critical data, or could include both critical and non-critical data. The value indicating the size of the buffer could represent the actual size, or a range (e.g. the size of the buffer is below "X" and above "Y", similar to the ranges defined for the buffer status report (BSR) in 3GPP technical specification 36.321). With some embodiments, this information can be indicated with 8 bits, or with n>=1 bit.

As an eighth example, provided information could indicate a logical channel group (LCG) ID that carries the critical data or that carries any data (including both critical and non-critical data). With some embodiments, this information can be indicated n>=1 bit.

As a ninth example, provided information could indicate a certain categorization of the data (e.g., type of service where data has a categorization with a value between 1 and n), which could help to enable prioritization schemes. With some embodiments, this information can be indicated n>=1 bit.

As a tenth example, provided information could indicate that the current data or packet is the last critical data stored in the buffer. With some embodiments, this information can be indicated n>=1 bit.

As an eleventh example, provided information could indicate a request of an expected change on the network side or a request indicating what is expected to change due to the critical data. Such requests may correspond to getting different scheduling handling (e.g., having more and/or larger grants, or the like), having additional protection for the UL grant (e.g., lower the modulation coding scheme (MCS), additional redundancy, different maximum number of retransmission, increase the number of repetitions required when operating in coverage enhancement (CE) mode). With some embodiments, this information can be indicated with 2 bits. For example:

[00] could indicate that eNB 102 (or gNB 104) is expected to change the UL grant allocation back to normal;
[01] could indicate that eNB 102 (or gNB 104) is expected to increase the redundancy;
[10] could indicate that eNB 102 (or gNB 104) is expected to allocate more UL resources;
[11] could indicate that eNB 102 (or gNB 104) is expected to increase redundancy and allocate more UL resources.

As a twelfth example, provided information could indicate the absence of critical data. Such an indication could be used by the network (e.g., eNB 102, gNB 104, or the like) to revert back to a normal confirmation (e.g. increasing MCS, reducing redundancy, or the like). With some embodiments, this information can be indicated n>=1 bit.

It is important to note, that any scheme for providing information can include indications that can be reserved for future usage. Furthermore, as noted above, the example information that can be provided may be included in any of a number or mechanisms, such as, for example, those described below. Furthermore, the information from the above examples, can be sent individually (e.g., in their own respective containers) or in any combination within the same container. In some examples, information from ones of the above examples can be designated as mandatory while information from other ones of the above examples can be designated as optional. Also, of note, the above examples are not intended to be an exhaustive list of all information that can be provided to indicate critical data but are instead provided for purposes of clarity and understanding.

As noted, some of the information from the examples listed above may be combined to provide multiple indications at once. For example, the first and second example could be combined with the information from the eleventh example as depicted in Table 1 shown below.

TABLE 1

| First Example (Critical data) | Second Example (Data to be Discarded) | Expected actions from node (e.g., eNB, gNB, etc.) |
| --- | --- | --- |
| 0 | 0 | Change the UL Grant Allocation Back to Normal |
| 1 | 0 | Increase the Redundancy |
| 0 | 1 | Allocate More UL Resources |
| 1 | 1 | Increase Redundancy and Allocate More UL Resources |

The disclosure now turns to describing various mechanisms for providing information indicating critical data. Such mechanisms are described with respect to various layers of the control plane protocol stack. Said differently, various layers of the control plane protocol stack (e.g., the media access control (MAC) layer, the PDCP layer, the radio link control (RLC) layer, the service data adaptation protocol (SDAP) layer, or the like) can communicate (e.g., send or receive) information indicating critical data. As another example, various packets or portions of packets (e.g., headers, or the like) can be augmented to provide informing indicating critical data.

It is noted, the various mechanisms or solutions described herein to communicate information indicating critical data can be used to convey information like any of the examples (e.g., example 1 to example 12) discussed above, or any combination of the above examples. However, for purposes of brevity, only a few of the above described examples are referenced below when discussing the mechanisms to communicate the information. This is not intended to be limiting. Furthermore, it is to be appreciated the present disclosure can be applied to communicating information indicating critical data for both the upload or download of data. Also, it is noted that although the examples herein discuss information conveyed between the UE (e.g., UE 106) and a node (e.g., eNB 102, gNB 104, or the like), the information conveyed can be used by the RAN (e.g., LTE-RAN 103, NG-RAN 105, or the like) or even core network (CN) nodes to optimize scheduling, prioritization, decisions on discarding, routing, etc. for traffic within the CN.

MAC Based Notification Mechanisms

With some examples, the UE (e.g., UE 106) can notify the node (e.g., eNB 102, gNB 104, or the like) using a MAC sub-header, using an extension of the buffer status report (BSR), using data volume indication, or using an existing or new MAC control element. Using such mechanisms or "containers," UE 106 can notify eNB 102 of the size of the key frame to assist eNB 102 in allocating the appropriate resource. As another example, UE 106 can set a flag to indicate whether the next grant should be provided with additional robustness. As a further example, the flag can be maintained while key frames are still buffered.

Figure 3:
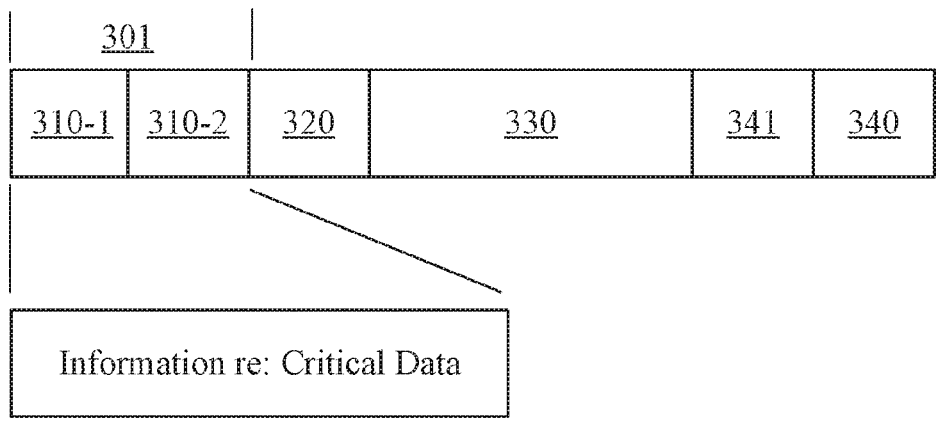
FIG. 3 illustrates a first embodiment of a communication flow.

FIG. 3 illustrates a MAC sub-header 300 that may be representative of an implementation of a MAC sub-header that can include information regarding critical data as discussed herein. As shown, the MAC sub-header 300 includes one or more reserved bits 301 (e.g., two reserved bit fields, or two reserved bits, are depicted in this figure). Mac-sub-header further includes an extension field 320, which defined one or more fields included in the MAC header; a logical channel ID (LCID) field 330 that defines the identity of the logical channel, type of MAC control element or padding; a length field 340 that defines the size of the MAC SDU; and an optical format bit 341 that defines the size of the length field.

In some examples, one or more of the reserved bits of a MAC sub-header (e.g., MAC protocol data unit (PDU) sub-header, MAC service data unit (SDU) sub-header, or the like) can be used, or defined, to indicate critical data. For example, reserved bits 301 could be defined to correspond to critical data fields 310-1 and 310-2 of MAC sub-header 300, which may indicate information based on any one or example 1 to example 12 discussed above, or any combination of example 1 to example 12 discussed above. It is noted, that sub-header 300 could include any number of reserved bits. Furthermore, any one or more of these reserved bits could be defined to indicate critical data. For example, a single one of the two reserved bits depicted could be defined to indicate critical data.

With some examples, a new value for the LCID field 330 of the MAC sub-header 300 could be defined to convey critical data, such as, on a per channel group basis. For example, many definitions for the LCID values include reserved values. One or more of these reserved values could be defined to convey information indicating critical data as discussed above.

Figure 4:
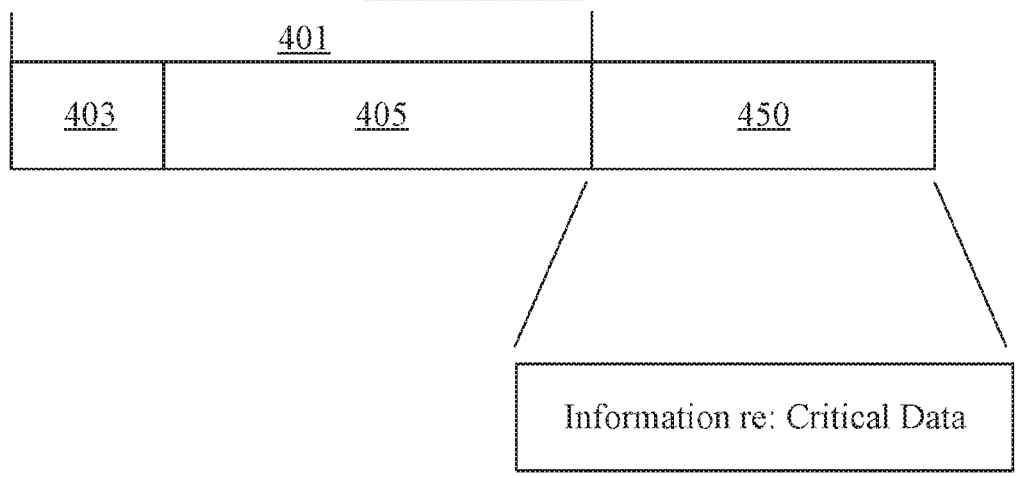
FIG. 4 illustrates a second embodiment of an RRC message structure.

FIG. 4 illustrates an extended buffer status report (BSR) 400 that may be representative of implementations of a BSR that can include information regarding critical data as discussed herein. As shown, the BSR 400 includes conventional BSR fields 401 and an extended BSR field 450. The conventional BSR fields 401 could include any number of fields corresponding to a BSR (e.g., a truncated BSR, a long BSR, or the like). For example, in the case of a truncated BSR, conventional fields 401 could include a logical channel group (LCG) ID field 403 indicating the buffer for which status is being reported and the buffer size field 405 indicating the size of the buffer.

The extended BSR field 450 could be any number of bits long. In some examples extended BSR field 450 could be an octet (8 bits), multiple octets, or the like. Extended BSR field 450 could convey information indicating critical data, for example, as discussed with respect to example 1 to example 12 above. As a specific example, the extended BSR field 450 could be used to indicate the size of the critical data (e.g., as discussed in example 7 above, or the like). Additionally, or alternatively information from example 1 to example 6 or example 8 to example 12 could be indicated by the additional bits in the extended BSR. With some embodiments, the size of the extended BSR 450 could depend upon whether the BSR 400 is a truncated BSR or a long BSR. For example, a truncated BSR 400 could be 2 octets long while a long BSR 400 could be 4 octets long.

In some embodiments, the reserved bit (e.g., reserved bit 310-1, reserved bit 310-2, or the like) in the MAC sub-header (e.g., MAC sub-header 300, or the like) could indicate that the extended BSR 400 is used as opposed to a conventional BSR (e.g., one without extended BSR field 450, or the like).

It is noted, that with some examples, an extended BSR, such as the extended BSR 400 could be implemented to report only the amount of critical data. For example, the extended BSR could include fields extended BSR field 450 only.

Figure 5:
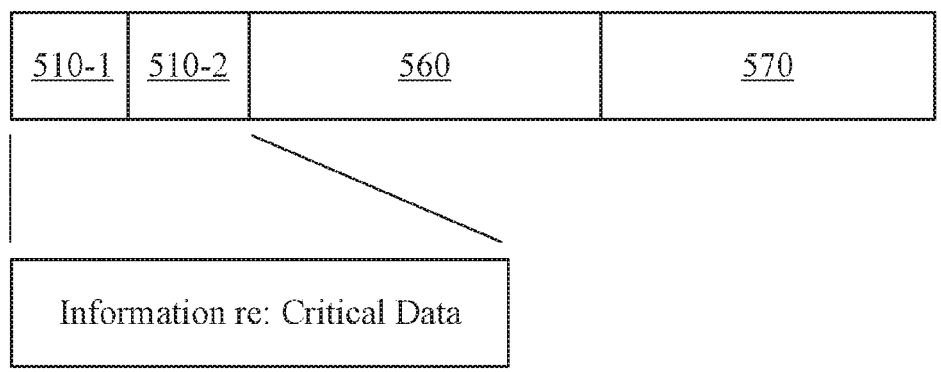
FIG. 5 illustrates a second embodiment of a communication flow.

FIG. 5 illustrates a combined data volume and power headroom report (DPR) MAC control element 500 that may be representative of implementations of a DPR MAC control element that can include information regarding critical data as discussed herein. As shown, the DPR MAC control element 500 includes critical data bits 510-1 and 510-2, a power headroom field 560, and a data volume field 570. The power headroom field 560 and data volume field 570 could be used to report data volumes and power used, respectively, relative to available data volumes and available power for the UE. The critical data bits 510-1 and 510-2 could be used to convey information (e.g., such as example 1 to example 12) indicating critical data.

Figure 6:
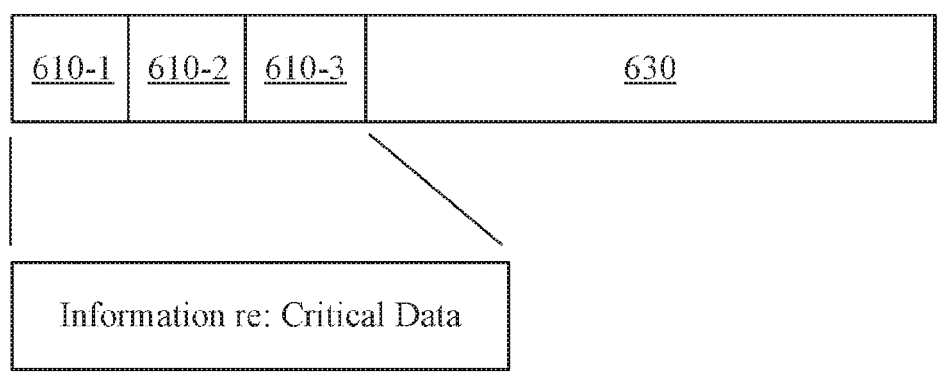
FIGS. 6A-6D illustrates embodiments of third, fourth, fifth, and sixth communication flows.

FIG. 6 illustrates a format for a MAC sub-header 600 that may be representative of implementations of a MAC sub-header that can include information regarding critical data as discussed herein. As shown, the MAC sub-header 600 includes critical data fields 610-1, 610-2 and 610-3 as well as an LCID field 630. It is noted that a MAC sub-header like MAC sub-header 600 could be formatted to include more or less critical data fields 610 than depicted in this figure. For example, a MAC sub-header could be provided with 2 critical data fields 610, 4 critical data fields 610, 5 critical data fields 610, etc. The LCID field 630 could define the logical channel for which the critical data is associated. In some examples, the LCID field 630 could include values and associated definitions as provided in Table 2 shown below.

TABLE 2

| Index | LCID Values |
| --- | --- |
| 00000 | CCCH |
| 00001-01010 | Identify of the Logical Channel |
| 01011 | CCCH |
| 01100 | CCCH |
| 01101 | Critical Data Reporting |
| 01110-10011 | Reserved |
| 10100 | Recommended Bit Rate Query |
| 10101 | SPS Confirmation |
| 10110 | Truncated Sidelink BSR |
| 10111 | Sidelink BSR |

TABLE 2-continued

| Index | LCID Values |
|---|---|
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

With some examples, the MAC sub-header 600 may not have any associated MAC PDUs.

Figure 7:
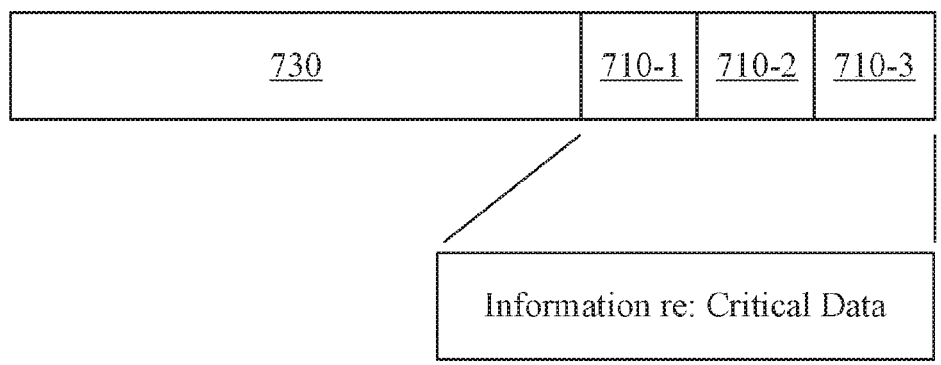
FIGS. 7A-7D illustrates embodiments of seventh, eighth, ninth, and tenth communication flows.

FIG. 7 illustrates a format for a MAC control element 700 that may be representative of implementations of a MAC control element that can include information regarding critical data as discussed herein. In some embodiments, the MAC control element 700 can be associated with the LCID 630 from MAC sub-header 600, and particularly the LCID field 630 values described with reference to Table 2. As shown, the MAC control element 700 includes critical data fields 710-1, 710-2 and 710-3 as well as an LCID field 730. It is noted that the information indicating critical data (e.g. example one, example 2, example, three, etc.) can be provided per logical channel, the MAC control element 700 might be larger than 1 octet. For example, the MAC control element 700 could provide information for any combination of the examples given above, which might necessitate the size of the MAC control element to be greater than one octet. As another example, the MAC control element 700 could provide information for more than one logical channel. As such, MAC control element 700 might include more fields than depicted in FIG. 7, such as, for example, fields to indicate the size or one (or more) extension bit(s) may indicate the extension of additional fields, or one header bitmaps may be defined to indicate how many logical channels are reported.

Figure 8:
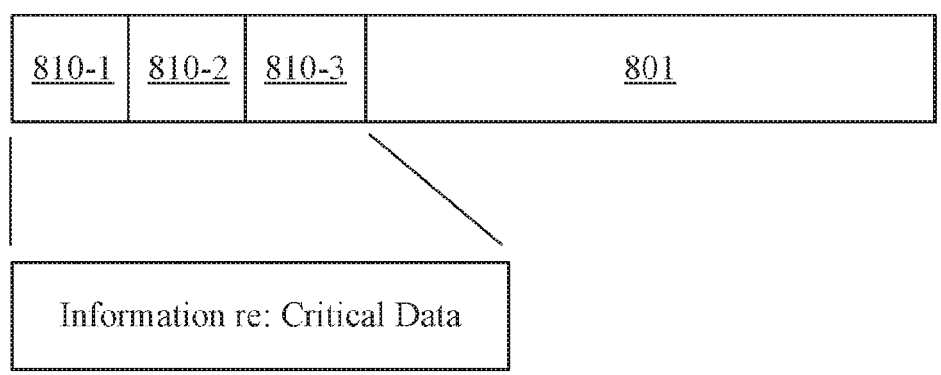
FIGS. 8A-8D illustrates embodiments of eleventh, twelfth, thirteenth, and fourteenth communication flows.

FIG. 8 illustrates a format for a MAC control element 800 that may be representative of implementations of a MAC control element that can include information regarding critical data as discussed herein. In some embodiments, the MAC control element 800 can be associated with the LCID 630 from MAC sub-header 600, and particularly the LCID field 630 values described with reference to Table 2. As shown, the MAC control element 800 includes critical data fields 810-1, 810-2 and 810-3 as well as one or more reserved bits 801.

With some embodiments, a MAC control element could be defined to provide an indication of the buffer size in addition to one or more indications of critical data, such as, for example, indications of critical data like the seventh example given above. With some examples, the MAC control element can have a similar structure to MAC control elements conveying BSR information. With some examples, the MAC control element could be specified with a defined size. In other examples, the MAC control element could have a variable size. Furthermore, the MAC control element could convey indications of critical data information corresponding to any one or more combinations of the examples given above, not limited to the seventh example.

Figure 9:
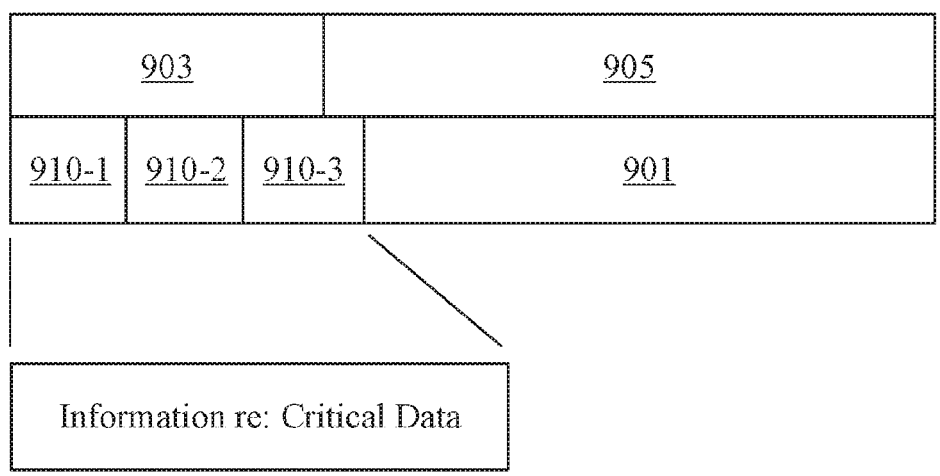
FIGS. 9A-9D illustrates embodiments of fifteenth, sixteenth, seventeenth, and eighteenth communication flows.

FIG. 9 illustrates a format for a MAC control element 900 that may be representative of implementations of a MAC control element that can include information regarding critical data as discussed herein. As shown, the MAC control element 900 includes an LCG ID field 903 indicating the buffer for which status is being reported as well as a buffer size field 905. Additionally, MAC control element 900 includes critical data fields 910-1, 910-2 and 910-3 as well as one or more reserved bits 901.

Figure 10:
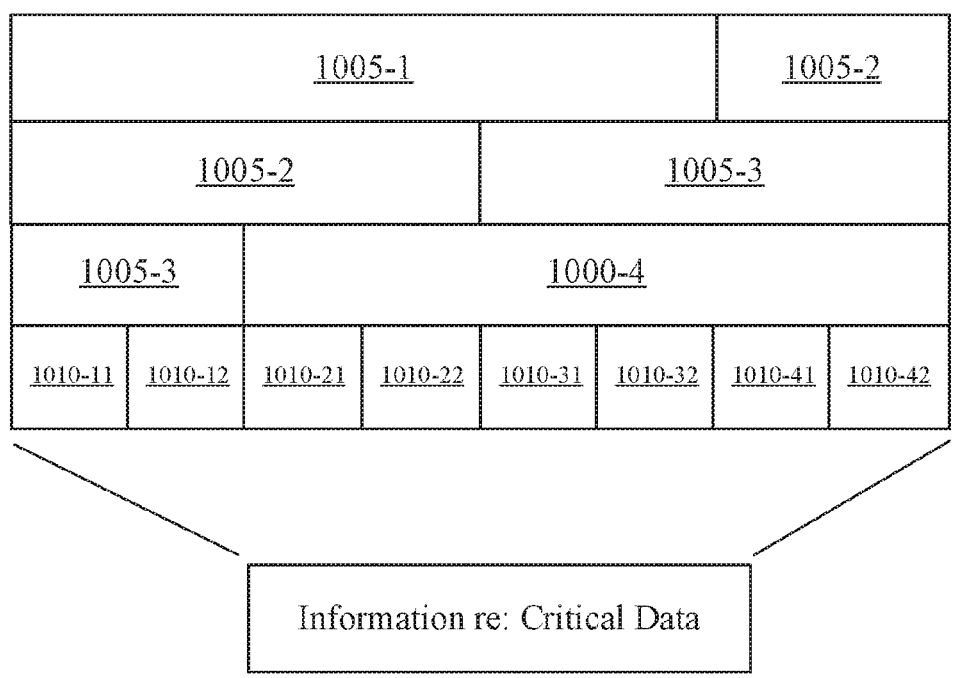
FIGS. 10A-10D illustrates embodiments of nineteenth, twentieth, twenty first, and twenty second communication flows.

FIG. 10 illustrates a format for a MAC control element 1000 that may be representative of implementations of a MAC control element that can include information regarding critical data as discussed herein. As shown, the MAC control element 1000 includes a number of buffer size fields 1005 as well as critical data fields 1010. With one or more critical data fields 1010 corresponding to each buffer specified in the buffer size fields 1005. For example, MAC control element 1000 depicts buffer size fields 1005-1, 1005-2, 1005-3 and 1005-4. Furthermore, two critical data fields 1010 are defined for each of the buffers corresponding to buffer size fields 1005-1 to 1005-4. For example, critical data fields 1010-11 and 1010-12 indicate critical data information for the buffer corresponding to buffer size field 1005-1, critical data fields 1010-21 and 1010-22 indicate critical data information for the buffer corresponding to buffer size field 1005-2, critical data fields 1010-31 and 1010-32 indicate critical data information for the buffer corresponding to buffer size field 1005-3, and critical data fields 1010-41 and 1010-42 indicate critical data information for the buffer corresponding to buffer size field 1005-4.

PDCP Based Notification Mechanisms

Figure 11:
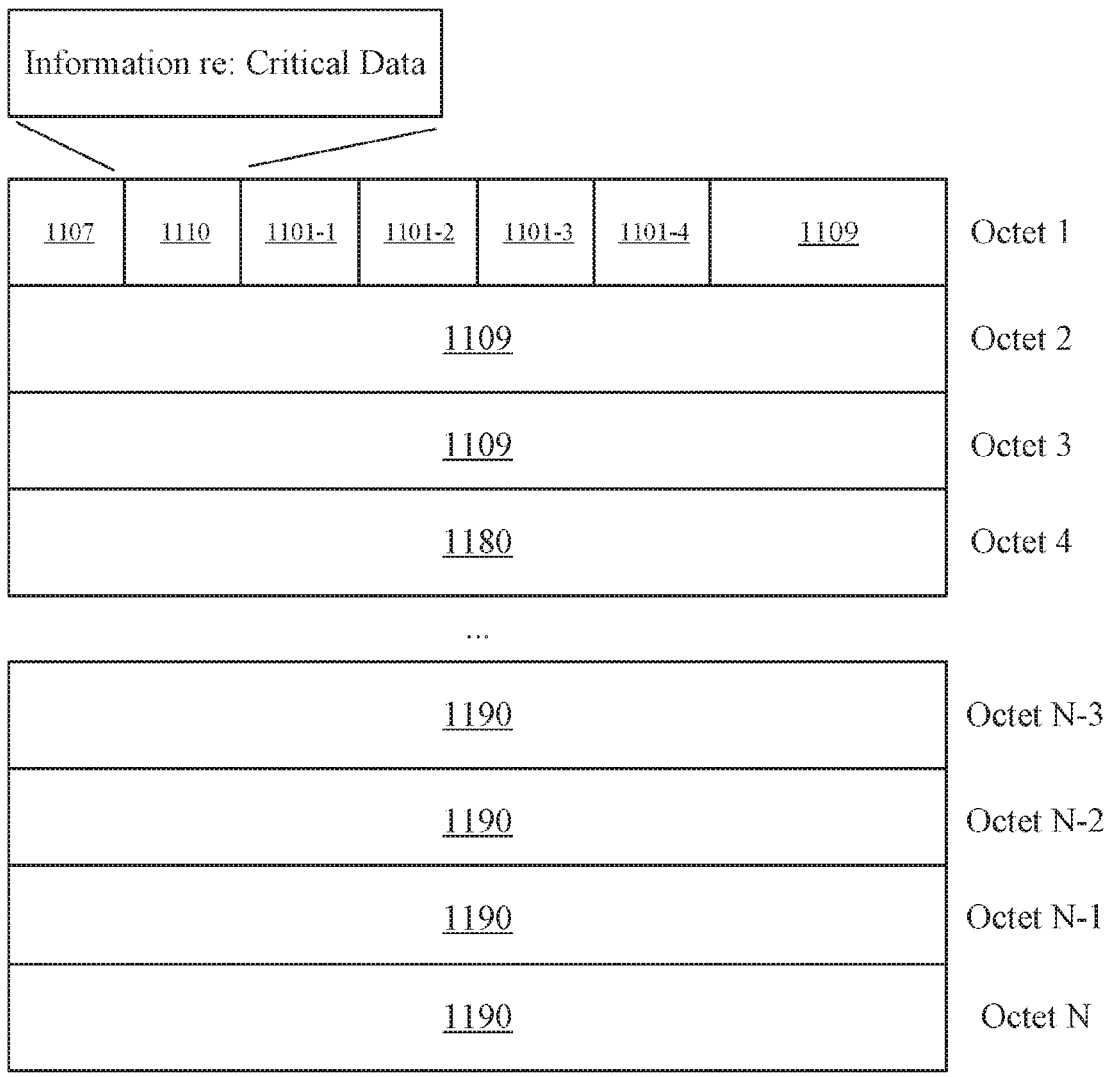
FIGS. 11A-11D illustrates embodiments of twenty third, twenty fourth, twenty fifth, and twenty sixth communication flows.

FIG. 11 illustrates a format for a PDCP header and data PDU 1101 that may be representative of implementations of a PDCP header that can include information regarding critical data as discussed herein. As shown, the PDCP header and data PDU 1100 includes a data/control (D/C) bit 1107 indicative of whether the packet carrier data or control information. Additionally, the PDCP header and data PDU 1100 includes a PDCP sequence number (SN) field 1109 indicative of an order of the packet relative to other packets. Additionally, the PDCP header and data PDU 1100 includes a number of reserved bits 1101, one of which has been defined to indicate critical data. For example, reserved bit 1101 are depicted as well as critical data field 1110. Thus, leaving reserved bits 1101-1, 1101-2, 1101-3 and 1101-4 available for future use.

PDCP header and data PDU 1100 is further depicted including a data field 1180 as well as MAC information fields 1190.

With some examples, the PDCP header and data PDU 1100 can also be used in the sender UE (e.g., UE 106) to notify lower layers of the presence of critical data. The lower layers can then prioritize resources to better service (or protect) this packet and potentially notify the network.

With some embodiments, any combination of the information described above (e.g., the examples given above) can be included in the reserved bits 1101. For example, any number of the reserved bits 1101 in the PDCP header could be used to convey the size of the critical data that is still stored in the buffer. Another example, any number of the reserved bits 1101 could be used to convey the type of service or priority associated with the data.

RLC Based Notification Mechanisms

Figure 12:
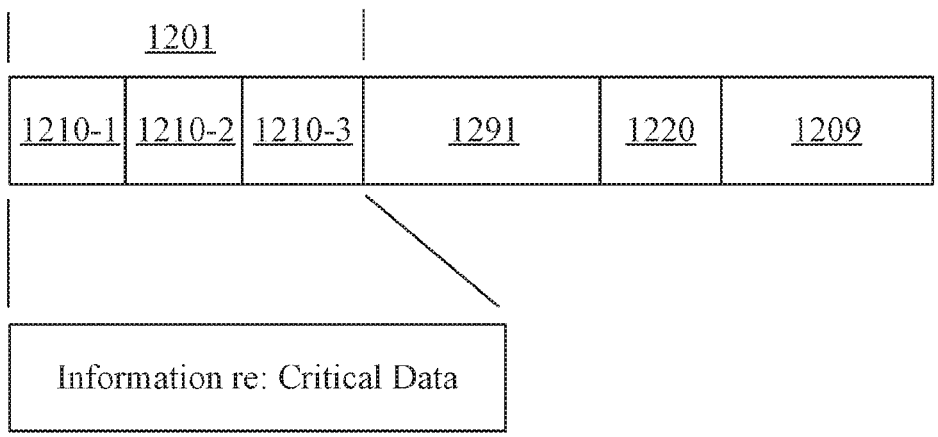
FIG. 12A-12B illustrates embodiments of first and second logic flows.

FIG. 12 illustrates a format for an RLC header 1200, which may correspond to a UMD PDU, an AMD PDU, or the like and can include information regarding critical data as discussed herein. As shown, the RLC header 1200 includes a number of reserved bits 1201, which have been defined to indicate critical data. For example, reserved bit 1201 are depicted as critical data fields 1210-1, 1210-2, and 1210-3. It is noted, that with some embodiments, not all reserved bits 1201 need be defined to indicate critical data. The RLC header further includes a framing information bit 1291, which indicates whether the associated RLC SDU is segmented or not; an extension field 1220 that indicates whether data or a set of extension fields and LI fields follows; and an SN field 1209 indicative of an order of the packet relative to other packets.

With some embodiments, any combination of the information described above (e.g., the examples given above) can be included in the critical data fields 1210-1 to 1210-3.

SDAP Based Notification Mechanisms

Figure 13:
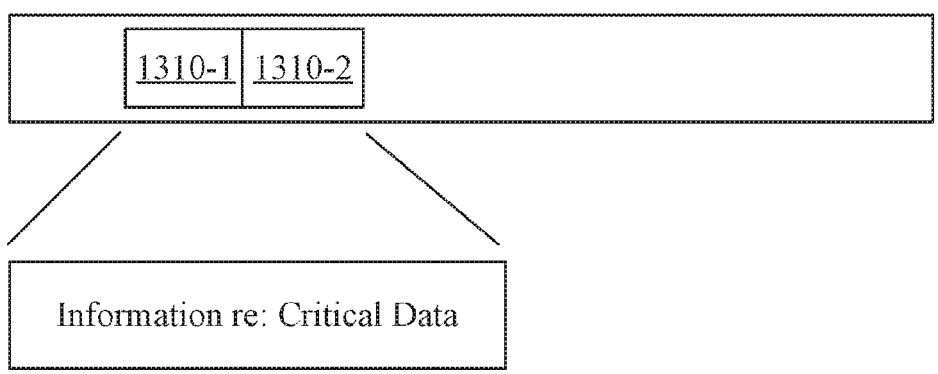
FIG. 13 illustrates embodiments of third and fourth logic flows.

FIG. 13 illustrates a format for an SDAP header 1300, which may correspond to an SDAP PDU, or the like and can include information regarding critical data as discussed herein. As shown, the SDAP header 1300 includes a number of critical data fields 1310-1 and 1310-2. With some embodiments, any combination of the information described above (e.g., the examples given above) can be included in the critical data fields 1310-1 and 1310-2.

In some examples, SDAP header 1300 can include a single (1 bit) critical data field 1310, which can be used to convey the presence of critical data. On sender side, this information can be used to inform lower layer(s) (PDCP, etc.) of the presence of critical data in order for lower layer(s) to prioritize or better protect this packet and potentially notify the network. On the receiver side this information can be used to notify upper layer(s) (e.g., RLC, MAC, etc.) of the presence of critical data. The upper layer(s) can then prioritize the processing if this packet.

Figure 14A:
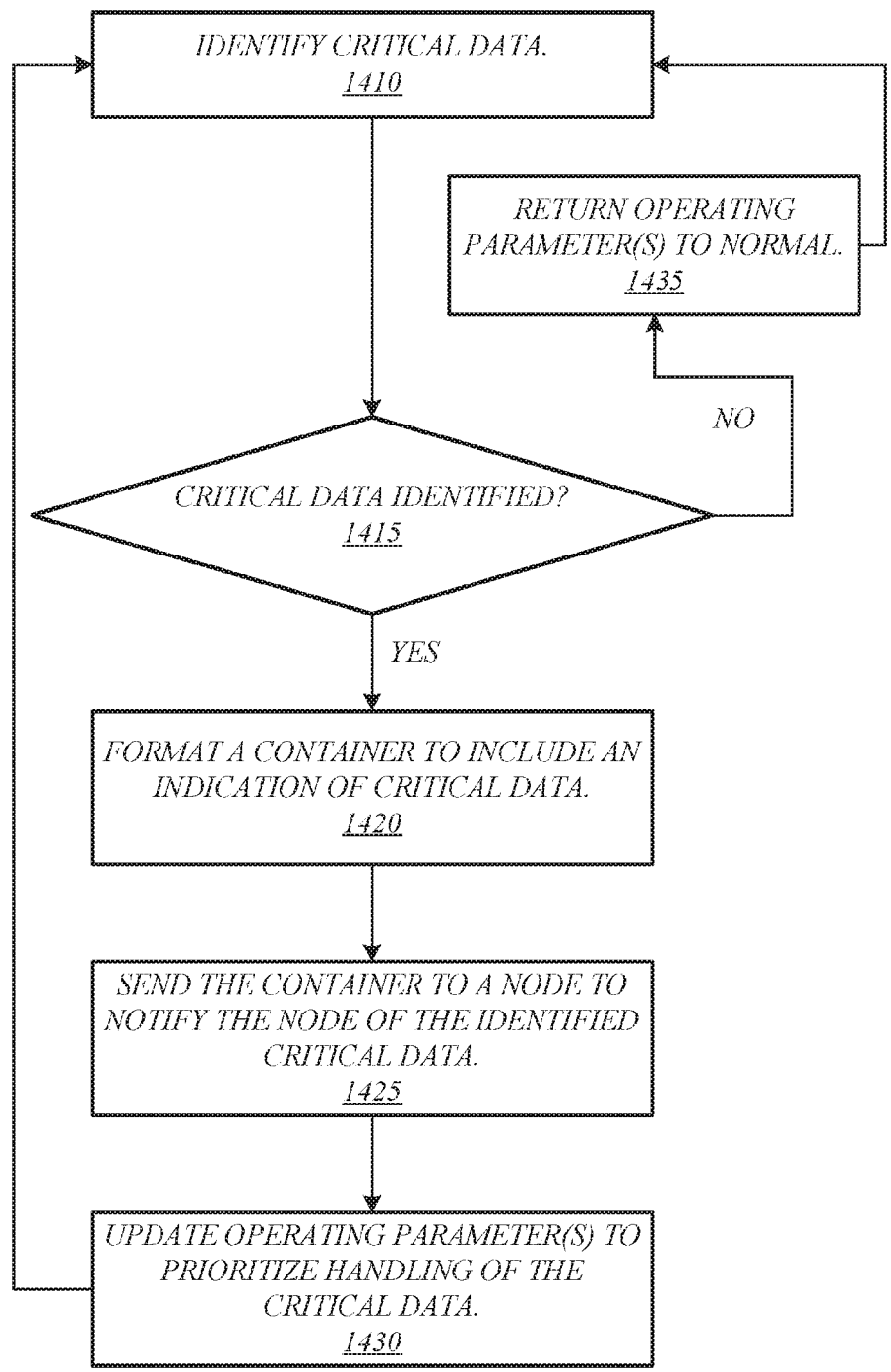
FIG. 14A illustrates an embodiment of a first logic flow.
Figure 14B:
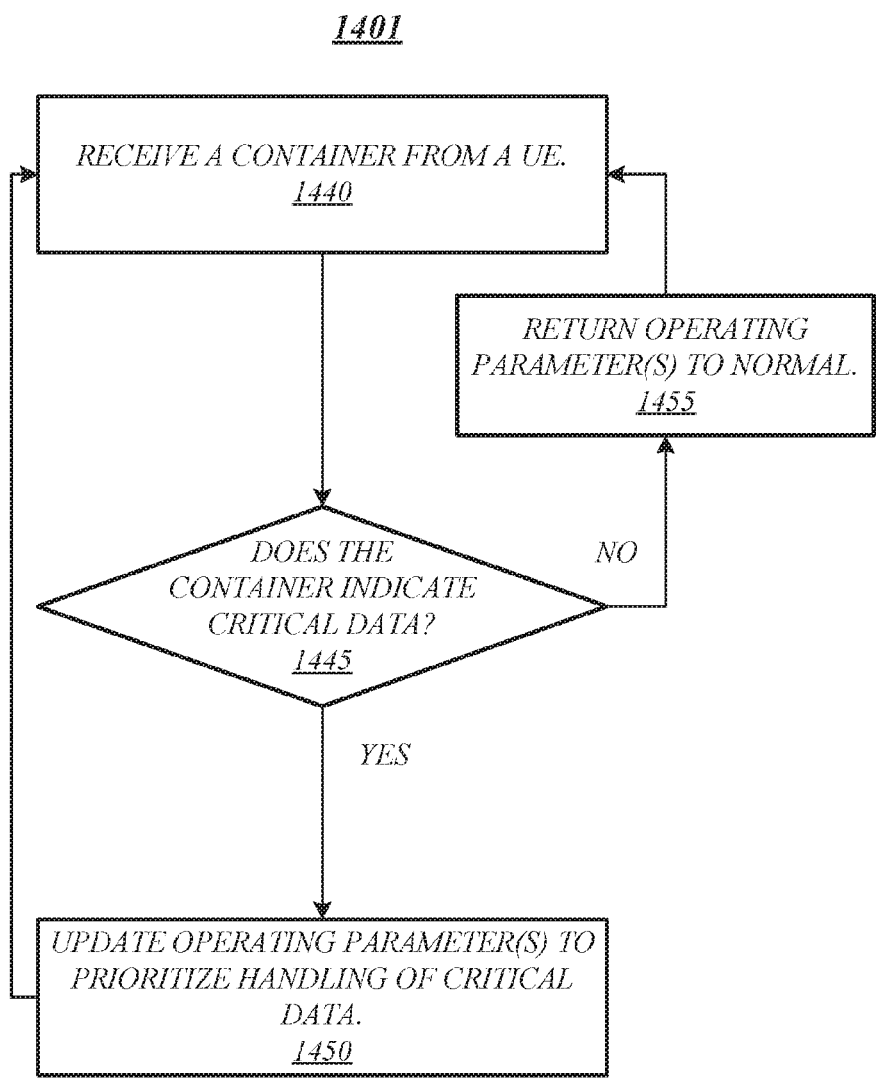
FIG. 14B illustrates an embodiment of a second logic flow.

FIGS. 14A and 14B illustrate examples of logic flows that may be representative of notifying entities of critical data. For example, FIG. 14A depicts a logic flow 1400 that may be representative of a UE notifying a node of critical data while FIG. 14B depicts a method 1401 that may be representative of a node receiving notification of critical data from a UE.

Turning to FIG. 14A, logic flow 1400 may begin at block 1410 "identify critical data" where a UE can identify critical data in a packet or buffer to be transmitted to a node. For example, UE 106 can identify critical data to be transmitted to either eNB 102 or gNB 104. Continuing to decision block 1415 "critical data identified" a determination can be as to whether critical data is identified. For example, UE 106 can determine whether critical data was identified as block 1410. Based on the determination as decision block 1415, logic flow 1400 can continue to either block 1420 or block 1435. Specifically, logic flow 1400 can continue from decision block 1415 to block 1420 based on a determination that critical data was identified while logic flow 1400 can continue from decision block 1415 to block 1435 based on a determination that critical data was not identified.

At block 1420 "format a container to include an indication of critical data" a UE can format a container to include an indication of critical data. For example, UE 106 can format a container (e.g., header, sub-header, PDU, or the like) to include an indication of critical data. Various specific examples of indications of critical data and mechanisms for formatting a container to include an indication of the critical data are provided above. Continuing to block 1425 "send the container to a node to notify the node of the identified critical data" the UE can send the formatted container to a node to notify the node of the identified critical data. For example, UE 106 can send the container (e.g., header, sub-header, PDU, or the like) to eNB 102, gNB 104, or the like to notify the node of the identified critical data.

Continuing to block 1430 "update operating parameter(s) to prioritize handling of the critical data" the UE can update operating parameters to prioritize the handling of the critical data. For example, UE 106 can update one or more operating parameters (e.g., lower the MCS, change redundancy, change the maximum number of retransmission, increase the number of repetitions required when operating in CE mode, etc.).

At block 1435 "return operating parameter(s) to normal" the UE can return operating parameters to normal (if needed) based on a determination that no critical data is identified. For example, UE 106 can return operating parameter(s) that may have been modified at block 1430 (e.g., during a prior iteration of logic flow 1400, or the like) to normal.

Turning to FIG. 14B, logic flow 1401 may begin at block 1440 "receive a container from a UE" where a node can receive a container from a UE. For example, eNB 102, gNB 104, or the like can receive a container (e.g., header, sub-header, PDU, or the like) from UE 106. Continuing to decision block 1445 "does the container indicate critical data" a determination can be made as to whether the container includes an indication of critical data. For example, the node can determine whether the container includes an indication (e.g., as detailed above) of critical data. Based on the determination as decision block 1445, logic flow 1401 can continue to either block 1450 or block 1455. Specifically, logic flow 1401 can continue from decision block 1445 to block 1450 based on a determination that container indicates critical data while logic flow 1401 can continue from decision block 1445 to block 1455 based on a determination that the container docs not indicate critical data.

At block 1450 "update operating parameter(s) to prioritize handling of the critical data" the node can update operating parameters to prioritize the handling of the critical data. For example, eNB 102, gNB 104, or the like can update one or more operating parameters (e.g., lower the MCS, change redundancy, change the maximum number of retransmission, increase the number of repetitions required when operating in CE mode, etc.).

At block 1455 "return operating parameter(s) to normal" the node can return operating parameters to normal (if needed) based on a determination that the container does not indicate critical data. For example, eNB 102, gNB 104, or the like can return operating parameter(s) that may have been modified at block 1450 (e.g., during a prior iteration of logic flow 1401, or the like) to normal.

Figure 15:
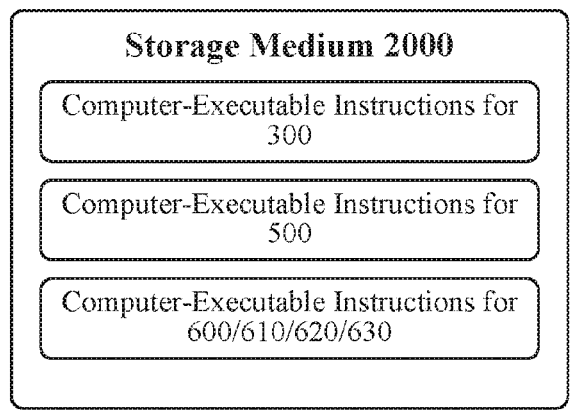
FIG. 15 illustrates an embodiment of a storage medium.

FIG. 15 illustrates an embodiment of a storage medium 1500. Storage medium 1500 may comprise any non-transitory computer-readable storage medium or machine-readable storage medium, such as an optical, magnetic or semiconductor storage medium. In various embodiments, storage medium 1500 may comprise an article of manufacture. In some embodiments, storage medium 1500 may store computer-executable instructions, such as computer-executable instructions to implement one or more of logic flow 1400 or logic flow 1401.

Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 16:
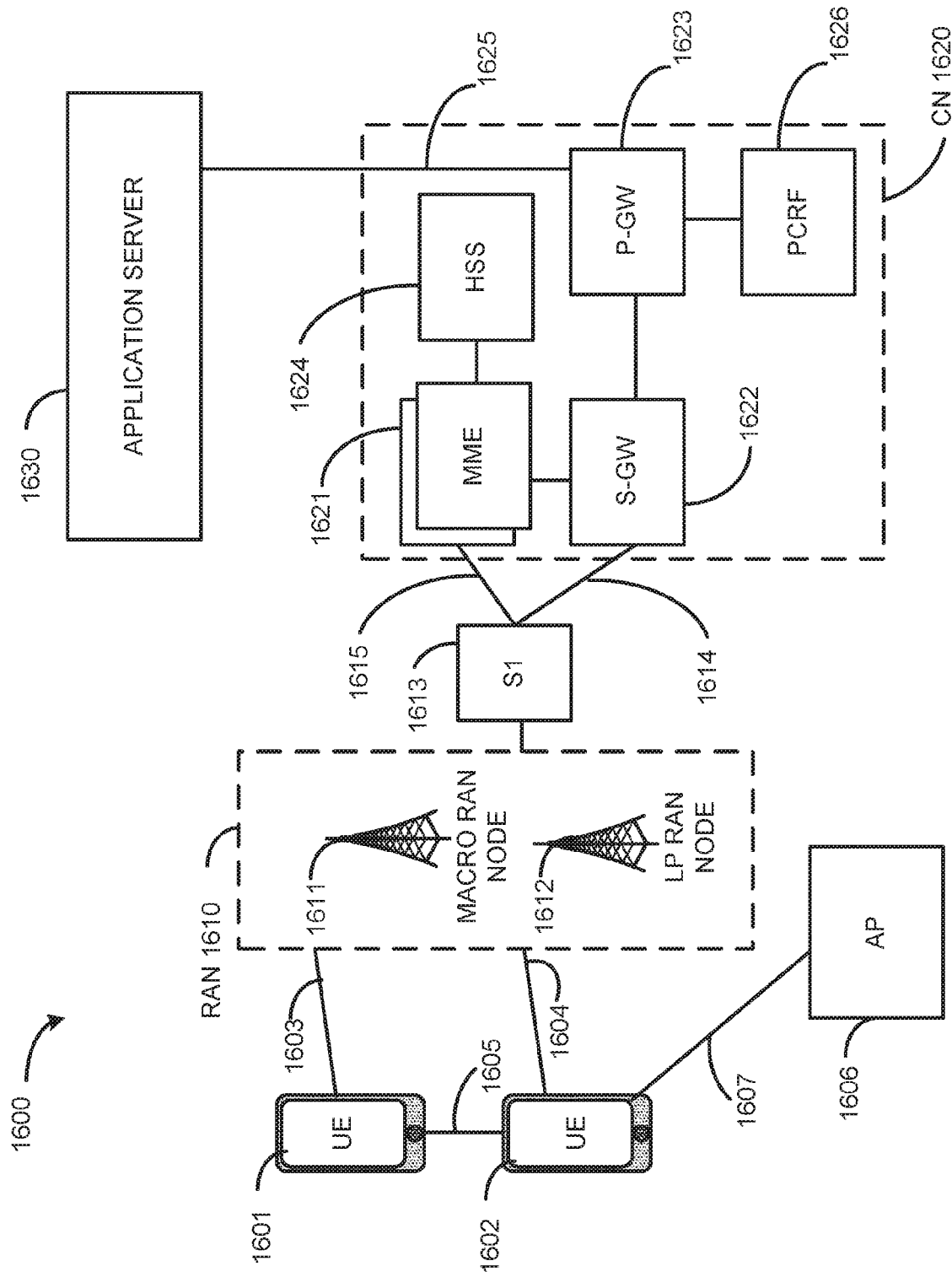
FIG. 16 illustrates an embodiment of a system architecture.

FIG. 16 illustrates an architecture of a system 1600 of a network in accordance with some embodiments. The system 1600 is shown to include a user equipment (UE) 1601 and a UE 1602. The UEs 1601 and 1602 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1601 and 1602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1601 and 1602 may be configured to connect, e.g., communicatively couple, with a radio access network (RAN) 1610—the RAN 1610 may be, for example, an Evolved Universal Mobile Telecommunications System (UMTS) Terrestrial Radio Access Network (E-UTRAN), a NextGen RAN (NG RAN), or some other type of RAN. The UEs 1601 and 1602 utilize connections 1603 and 1604, respectively, each of which comprises a physical communications interface or layer (discussed in further detail below); in this example, the connections 1603 and 1604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1601 and 1602 may further directly exchange communication data via a ProSe interface 1605. The ProSe interface 1605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1602 is shown to be configured to access an access point (AP) 1606 via connection 1607. The connection 1607 can comprise a local wireless connection, such as a connection consistent with any IEEE 802.11 protocol, wherein the AP 1606 would comprise a wireless fidelity (WiFi®) router. In this example, the AP 1606 is shown to be connected to the Internet without connecting to the core network of the wireless system (described in further detail below).

The RAN 1610 can include one or more access nodes that enable the connections 1603 and 1604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1610 may include one or more RAN nodes for providing macrocells, e.g., macro RAN node 1611, and one or more RAN nodes for providing femtocells or picocells (e.g., cells having smaller coverage areas, smaller user capacity, or higher bandwidth compared to macrocells), e.g., low power (LP) RAN node 1612.

Any of the RAN nodes 1611 and 1612 can terminate the air interface protocol and can be the first point of contact for the UEs 1601 and 1602. In some embodiments, any of the RAN nodes 1611 and 1612 can fulfill various logical functions for the RAN 1610 including, but not limited to, radio network controller (RNC) functions such as radio bearer management, uplink and downlink dynamic radio resource management and data packet scheduling, and mobility management.

In accordance with some embodiments, the UEs 1601 and 1602 can be configured to communicate using Orthogonal Frequency-Division Multiplexing (OFDM) communication signals with each other or with any of the RAN nodes 1611 and 1612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1611 and 1612 to the UEs 1601 and 1602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1601 and 1602. The physical downlink control channel (PDCCH) may carry information about the transport format and resource allocations related to the PDSCH channel, among other things. It may also inform the UEs 1601 and 1602 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1611 and 1612 based on channel quality information fed back from any of the UEs 1601 and 1602. The downlink resource assignment information may be sent on the PDCCH used for (e.g., assigned to) each of the UEs 1601 and 1602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 1610 is shown to be communicatively coupled to a core network (CN) 1620—via an S1 interface 1613. In embodiments, the CN 1620 may be an evolved packet core (EPC) network, a NextGen Packet Core (NPC) network, or some other type of CN. In this embodiment the S1 interface 1613 is split into two parts: the S1-U interface 1614, which carries traffic data between the RAN nodes 1611 and 1612 and the serving gateway (S-GW) 1622, and the S1—mobility management entity (MME) interface 1615, which is a signaling interface between the RAN nodes 1611 and 1612 and MMEs 1621.

In this embodiment, the CN 1620 comprises the MMEs 1621, the S-GW 1622, the Packet Data Network (PDN) Gateway (P-GW) 1623, and a home subscriber server (HSS) 1624. The MMEs 1621 may be similar in function to the control plane of legacy Serving General Packet Radio Service (GPRS) Support Nodes (SGSN). The MMEs 1621 may manage mobility aspects in access such as gateway selection and tracking area list management. The HSS 1624 may comprise a database for network users, including subscription-related information to support the network entities' handling of communication sessions. The CN 1620 may comprise one or several HSSs 1624, depending on the number of mobile subscribers, on the capacity of the equipment, on the organization of the network, etc. For example, the HSS 1624 can provide support for routing/roaming, authentication, authorization, naming/addressing resolution, location dependencies, etc.

The S-GW 1622 may terminate the S1 interface 1613 towards the RAN 1610, and routes data packets between the RAN 1610 and the CN 1620. In addition, the S-GW 1622 may be a local mobility anchor point for inter-RAN node handovers and also may provide an anchor for inter-3GPP mobility. Other responsibilities may include lawful intercept, charging, and some policy enforcement.

The P-GW 1623 may terminate an SGi interface toward a PDN. The P-GW 1623 may route data packets between the EPC network 1623 and external networks such as a network including to the application server 1630 (alternatively referred to as application function (AF)) via an Internet Protocol (IP) interface 1625. Generally, the application server 1630 may be an element offering applications that use IP bearer resources with the core network (e.g., UMTS Packet Services (PS) domain, LTE PS data services, etc.). In this embodiment, the P-GW 1623 is shown to be communicatively coupled to an application server 1630 via an IP communications interface 1625. The application server 1630 can also be configured to support one or more communication services (e.g., Voice-over-Internet Protocol (VoIP) sessions, PTT sessions, group communication sessions, social networking services, etc.) for the UEs 1601 and 1602 via the CN 1620.

The P-GW 1623 may further be a node for policy enforcement and charging data collection. Policy and Charging Enforcement Function (PCRF) 1626 is the policy and charging control element of the CN 1620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1626 may be communicatively coupled to the application server 1630 via the P-GW 1623. The application server 1630 may signal the PCRF 1626 to indicate a new service flow and select the appropriate Quality of Service (QoS) and charging parameters. The PCRF 1626 may provision this rule into a Policy and Charging Enforcement Function (PCEF) (not shown) with the appropriate traffic flow template (TFT) and QoS class of identifier (QCI), which commences the QoS and charging as specified by the application server 1630.

Figure 17:
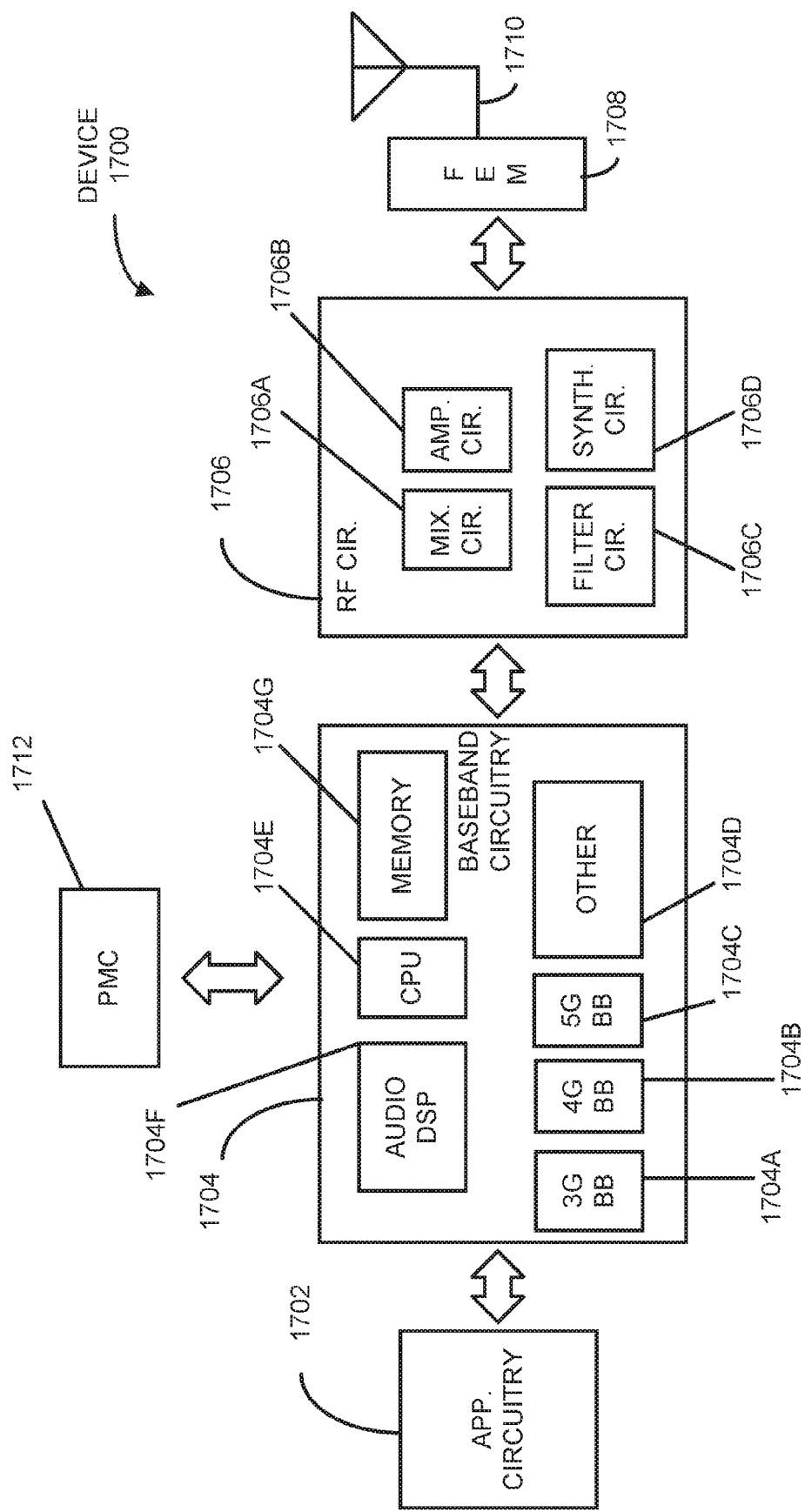
FIG. 17 illustrates an embodiment of a device.

FIG. 17 illustrates example components of a device 1700 in accordance with some embodiments. In some embodiments, the device 1700 may include application circuitry 1702, baseband circuitry 1704, Radio Frequency (RF) circuitry 1706, front-end module (ELM) circuitry 1708, one or more antennas 1710, and power management circuitry (PMC) 1712 coupled together at least as shown. The components of the illustrated device 1700 may be included in a UE or a RAN node. In some embodiments, the device 1700 may include less elements (e.g., a RAN node may not utilize application circuitry 1702, and instead include a processor/controller to process IP data received from an EPC). In some embodiments, the device 1700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1700. In some embodiments, processors of application circuitry 1702 may process IP data packets received from an EPC.

The baseband circuitry 1704 may include circuitry such as, but not limited to, one or more single-core or multi-core processors. The baseband circuitry 1704 may include one or more baseband processors or control logic to process baseband signals received from a receive signal path of the RF circuitry 1706 and to generate baseband signals for a transmit signal path of the RF circuitry 1706. Baseband processing circuitry 1704 may interface with the application circuitry 1702 for generation and processing of the baseband signals and for controlling operations of the RF circuitry 1706. For example, in some embodiments, the baseband circuitry 1704 may include a third generation (3G) baseband processor 1704A, a fourth generation (4G) baseband processor 1704B, a fifth generation (5G) baseband processor 1704C, or other baseband processor(s) 1704D for other existing generations, generations in development or to be developed in the future (e.g., second generation (2G), sixth generation (6G), etc.). The baseband circuitry 1704 (e.g., one or more of baseband processors 1704A-D) may handle various radio control functions that enable communication with one or more radio networks via the RF circuitry 1706. In other embodiments, some or all of the functionality of baseband processors 1704A-D may be included in modules stored in the memory 1704G and executed via a Central Processing Unit (CPU) 1704E. The radio control functions may include, but are not limited to, signal modulation/demodulation, encoding/decoding, radio frequency shifting, etc. In some embodiments, modulation/demodulation circuitry of the baseband circuitry 1704 may include Fast-Fourier Transform (FFT), precoding, or constellation mapping/demapping functionality. In some embodiments, encoding/decoding circuitry of the baseband circuitry 1704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include one or more audio digital signal processor(s) (DSP) 1704F. The audio DSP(s) 1704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various embodiments, the RF circuitry 1706 may include switches, filters, amplifiers, etc. to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the receive signal path of the RF circuitry 1706 may include mixer circuitry 1706a, amplifier circuitry 1706b and filter circuitry 1706c. In some embodiments, the transmit signal path of the RF circuitry 1706 may include filter circuitry 1706c and mixer circuitry 1706a. RF circuitry 1706 may also include synthesizer circuitry 1706d for synthesizing a frequency for use by the mixer circuitry 1706a of the receive signal path and the transmit signal path. In some embodiments, the mixer circuitry 1706a of the receive signal path may be configured to down-convert RF signals received from the FEM circuitry 1708 based on the synthesized frequency provided by synthesizer circuitry 1706d. The amplifier circuitry 1706b may be configured to amplify the down-converted signals and the filter circuitry 1706c may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706a of the receive signal path may comprise passive mixers, although the scope of the embodiments is not limited in this respect.

In some embodiments, the mixer circuitry 1706a of the transmit signal path may be configured to up-convert input baseband signals based on the synthesized frequency provided by the synthesizer circuitry 1706d to generate RF output signals for the FEM circuitry 1708. The baseband signals may be provided by the baseband circuitry 1704 and may be filtered by filter circuitry 1706c.

In some embodiments, the mixer circuitry 1706a of the receive signal path and the mixer circuitry 1706a of the transmit signal path may include two or more mixers and may be arranged for quadrature downconversion and upconversion, respectively. In some embodiments, the mixer circuitry 1706a of the receive signal path and the mixer circuitry 1706a of the transmit signal path may include two or more mixers and may be arranged for image rejection (e.g., Hartley image rejection). In some embodiments, the mixer circuitry 1706a of the receive signal path and the mixer circuitry 1706a may be arranged for direct downconversion and direct upconversion, respectively. In some embodiments, the mixer circuitry 1706a of the receive signal path and the mixer circuitry 1706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706*d* may be a fractional-N synthesizer or a fractional N/N+1 synthesizer, although the scope of the embodiments is not limited in this respect as other types of frequency synthesizers may be suitable. For example, synthesizer circuitry 1706*d* may be a delta-sigma synthesizer, a frequency multiplier, or a synthesizer comprising a phase-locked loop with a frequency divider.

The synthesizer circuitry 1706*d* may be configured to synthesize an output frequency for use by the mixer circuitry 1706*a* of the RF circuitry 1706 based on a frequency input and a divider control input. In some embodiments, the synthesizer circuitry 1706*d* may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706*d* of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710. In various embodiments, the amplification through the transmit or receive signal paths may be done solely in the RF circuitry 1706, solely in the FEM 1708, or in both the RF circuitry 1706 and the FEM 1708.

In some embodiments, the FEM circuitry 1708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710).

In some embodiments, the PMC 1712 may manage power provided to the baseband circuitry 1704. In particular, the PMC 1712 may control power-source selection, voltage scaling, battery charging, or DC-to-DC conversion. The PMC 1712 may often be included when the device 1700 is capable of being powered by a battery, for example, when the device is included in a UE. The PMC 1712 may increase the power conversion efficiency while providing desirable implementation size and heat dissipation characteristics.

This figure shows the PMC 1712 coupled only with the baseband circuitry 1704. However, in other embodiments, the PMC 1712 may be additionally or alternatively coupled with, and perform similar power management operations for, other components such as, but not limited to, application circuitry 1702, RF circuitry 1706, or FEM 1708.

In some embodiments, the PMC 1712 may control, or otherwise be part of, various power saving mechanisms of the device 1700. For example, if the device 1700 is in an RRC_Connected state, where it is still connected to the RAN node as it expects to receive traffic shortly, then it may enter a state known as Discontinuous Reception Mode (DRX) after a period of inactivity. During this state, the device 1700 may power down for brief intervals of time and thus save power.

If there is no data traffic activity for an extended period of time, then the device 1700 may transition off to an RRC_Idle state, where it disconnects from the network and docs not perform operations such as channel quality feedback, handover, etc. The device 1700 goes into a very low power state and it performs paging where again it periodically wakes up to listen to the network and then powers down again. The device 1700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1702 and processors of the baseband circuitry 1704 may be used to execute elements of one or more instances of a protocol stack. For example, processors of the baseband circuitry 1704, alone or in combination, may be used execute Layer 3, Layer 2, or Layer 1 functionality, while processors of the application circuitry 1704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 18:
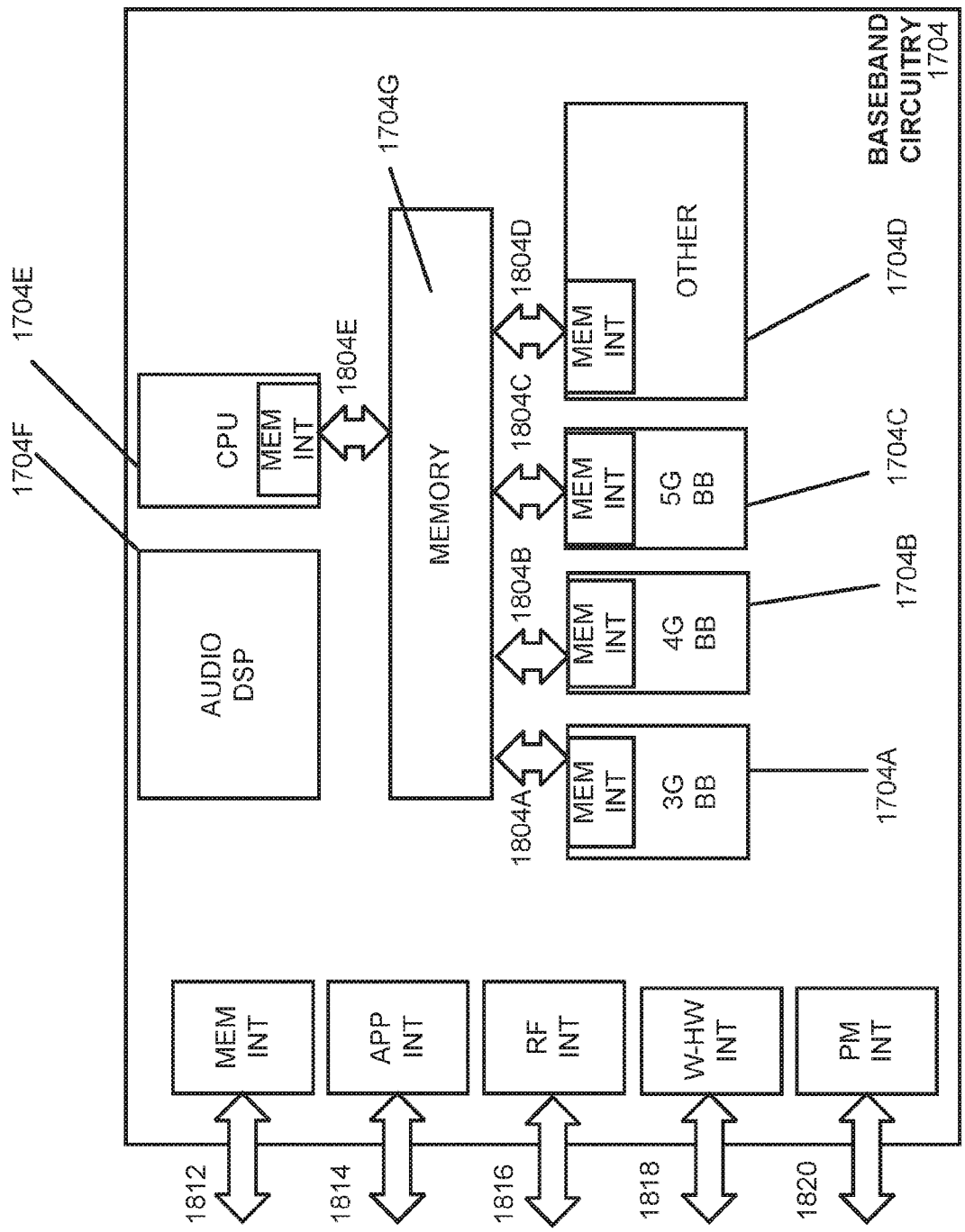
FIG. 18 illustrates an embodiment of baseband circuitry.

FIG. 18 illustrates example interfaces of baseband circuitry in accordance with some embodiments. As discussed above, the baseband circuitry 1704 of FIG. 17 may comprise processors 1704A-1704E and a memory 1704G utilized by said processors. Each of the processors 1704A-1704E may include a memory interface, 1804A-1804E, respectively, to send/receive data to/from the memory 1704G.

The baseband circuitry 1704 may further include one or more interfaces to communicatively couple to other circuitries/devices, such as a memory interface 1812 (e.g., an interface to send/receive data to/from memory external to the baseband circuitry 1704), an application circuitry interface 1814 (e.g., an interface to send/receive data to/from the application circuitry 1702 of FIG. 17), an RF circuitry interface 1816 (e.g., an interface to send/receive data to/from RF circuitry 1706 of FIG. 17), a wireless hardware connectivity interface 1818 (e.g., an interface to send/receive data to/from Near Field Communication (NFC) components, Bluetooth® components (e.g., Bluetooth® Low Energy), Wi-Fi® components, and other communication components), and a power management interface 1820 (e.g., an interface to send/receive power or control signals to/from the PMC 1712.

Figure 19:
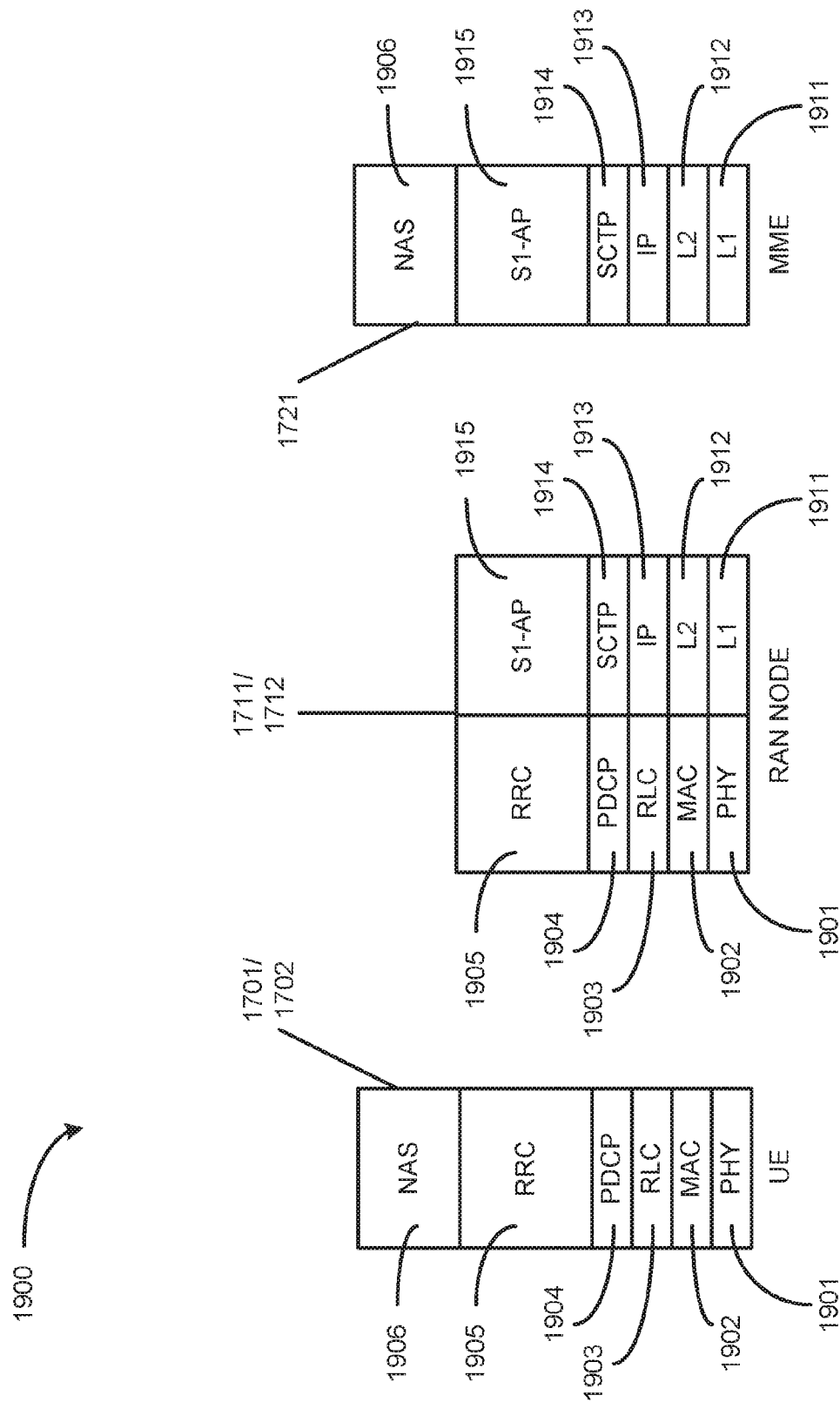
FIG. 19 illustrates an embodiment of a control plane protocol stack.

FIG. 19 is an illustration of a control plane protocol stack in accordance with some embodiments. In this embodiment, a control plane 1900 is shown as a communications protocol stack between the UE 1701 (or alternatively, the UE 1702), the RAN node 1711 (or alternatively, the RAN node 1712), and the MME 1721.

The PHY layer 1901 may transmit or receive information used by the MAC layer 1902 over one or more air interfaces. The PHY layer 1901 may further perform link adaptation or adaptive modulation and coding (AMC), power control, cell search (e.g., for initial synchronization and handover purposes), and other measurements used by higher layers, such as the RRC layer 1905. The PHY layer 1901 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1902 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1903 may operate in a plurality of modes of operation, including: Transparent Mode (TM), Unacknowledged Mode (UM), and Acknowledged Mode (AM). The RLC layer 1903 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1903 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1905 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1701 and the RAN node 1711 may utilize a Uu interface (e.g., an LTE-Uu interface) to exchange control plane data via a protocol stack comprising the PHY layer 1901, the MAC layer 1902, the RLC layer 1903, the PDCP layer 1904, and the RRC layer 1905.

The non-access stratum (NAS) protocols 1906 form the highest stratum of the control plane between the UE 1701 and the MME 1721. The NAS protocols 1906 support the mobility of the UE 1701 and the session management procedures to establish and maintain IP connectivity between the UE 1701 and the P-GW 1723.

The S1 Application Protocol (S1-AP) layer 1915 may support the functions of the S1 interface and comprise Elementary Procedures (EPs). An EP is a unit of interaction between the RAN node 1711 and the CN 1720. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1914 may ensure reliable delivery of signaling messages between the RAN node 1711 and the MME 1721 based, in part, on the IP protocol, supported by the IP layer 1913. The L2 layer 1912 and the L1 layer 1911 may refer to communication links (e.g., wired or wireless) used by the RAN node and the MME to exchange information.

The RAN node 1711 and the MME 1721 may utilize an S1-MME interface to exchange control plane data via a protocol stack comprising the L1 layer 1911, the L2 layer 1912, the IP layer 1913, the SCTP layer 1914, and the S1-AP layer 1915.

Figure 20:
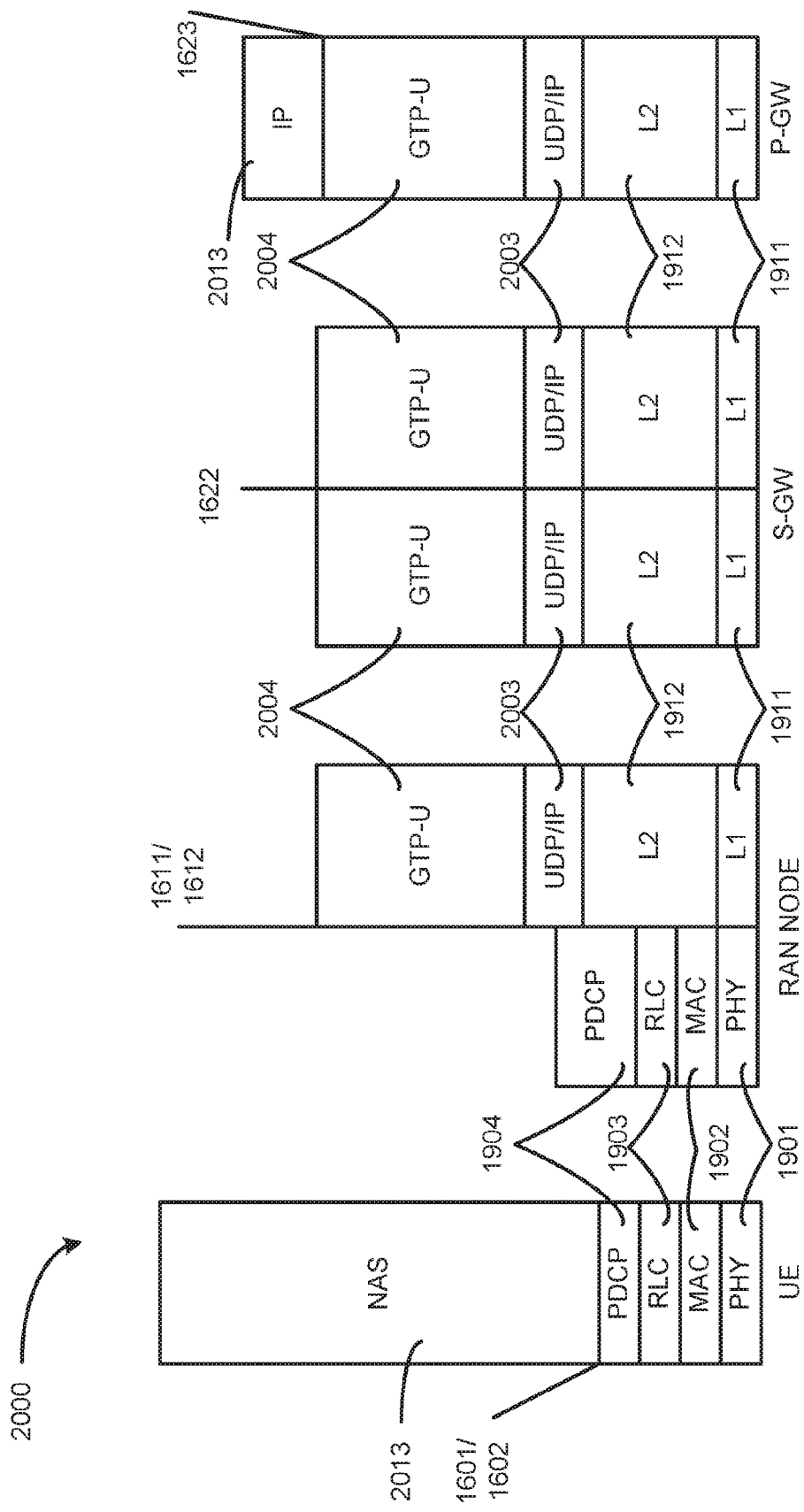
FIG. 20 illustrates an embodiment of a user plane protocol stack.

FIG. 20 is an illustration of a user plane protocol stack in accordance with some embodiments. In this embodiment, a user plane 2000 is shown as a communications protocol stack between the UE 1601 (or alternatively, the UE 1602), the RAN node 1611 (or alternatively, the RAN node 1612), the S-GW 1622, and the P-GW 1623. The user plane 2000 may utilize at least some of the same protocol layers as the control plane 1900. For example, the UE 1601 and the RAN node 1611 may utilize a Uu interface (e.g., an LTE-Uu interface) to exchange user plane data via a protocol stack comprising the PHY layer 1901, the MAC layer 1902, the RLC layer 1903, the PDCP layer 1904.

The General Packet Radio Service (GPRS) Tunneling Protocol for the user plane (GTP-U) layer 2004 may be used for carrying user data within the GPRS core network and between the radio access network and the core network. The user data transported can be packets in any of IPv4, IPv6, or PPP formats, for example. The UDP and IP security (UDP/IP) layer 2003 may provide checksums for data integrity, port numbers for addressing different functions at the source and destination, and encryption and authentication on the selected data flows. The RAN node 1611 and the S-GW 1622 may utilize an S1-U interface to exchange user plane data via a protocol stack comprising the L1 layer 1911, the L2 layer 1912, the UDP/IP layer 2003, and the GTP-U layer 2004. The S-GW 1622 and the P-GW 1623 may utilize an S5/S8a interface to exchange user plane data via a protocol stack comprising the L1 layer 1911, the L2 layer 19112, the UDP/IP layer 2003, and the GTP-U layer 2004. As discussed above with respect to FIG. 19, NAS protocols support the mobility of the UE 1601 and the session management procedures to establish and maintain IP connectivity between the UE 1601 and the P-GW 1623.\

Figure 21:
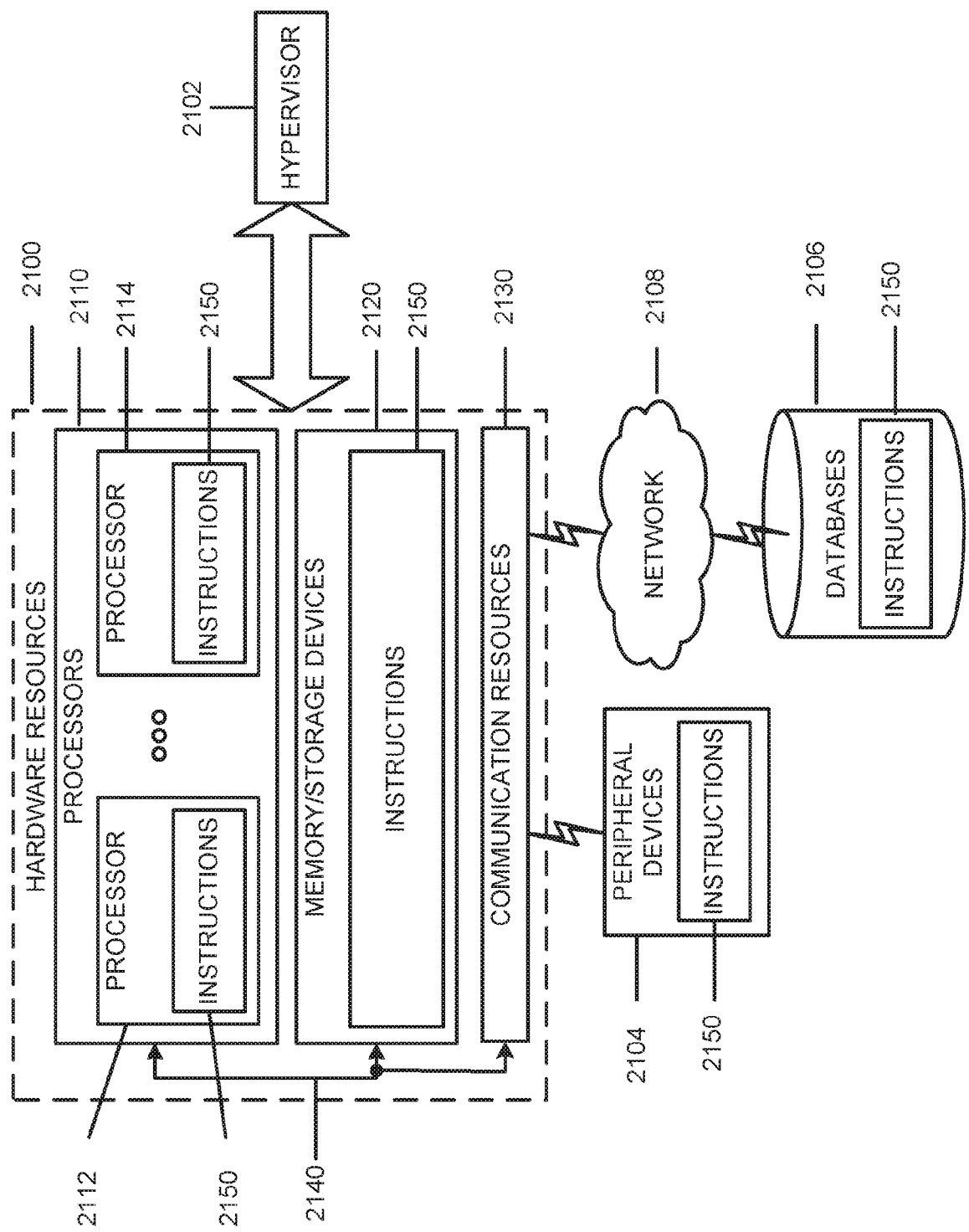
FIG. 21 illustrates an embodiment of a set of hardware resources.

FIG. 21 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 21 shows a diagrammatic representation of hardware resources 2100 including one or more processors (or processor cores) 2110, one or more memory/storage devices 2120, and one or more communication resources 2130, each of which may be communicatively coupled via a bus 2140. For embodiments where node virtualization (e.g., NFV) is utilized, a hypervisor 2102 may be executed to provide an execution environment for one or more network slices/sub-slices to utilize the hardware resources 2100

The processors 2110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2112 and a processor 2114.

The memory/storage devices 2120 may include main memory, disk storage, or any suitable combination thereof. The memory/storage devices 2120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 2130 may include interconnection or network interface components or other suitable devices to communicate with one or more peripheral devices 2104 or one or more databases 2106 via a network 2108. For example, the communication resources 2130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2150 may comprise software, a program, an application, an applet, an app, or other executable code for causing at least any of the processors 2110 to perform any one or more of the methodologies discussed herein. The instructions 2150 may reside, completely or partially, within at least one of the processors 2110 (e.g., within the processor's cache memory), the memory/storage devices 2120, or any suitable combination thereof. Furthermore, any portion of the instructions 2150 may be transferred to the hardware resources 2100 from any combination of the peripheral devices 2104 or the databases 2106. Accordingly, the memory of processors 2110, the memory/storage devices 2120, the peripheral devices 2104, and the databases 2106 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, ASICs, programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following examples pertain to further embodiments:

EXAMPLE 1

An apparatus, comprising: a memory to store an information element including an indication of the presence of critical data; and circuitry for user equipment (UE) coupled to the memory, the circuitry to send the information element to a node (NB) of a radio access network (RAN) to cause the NB to modify one or more settings that effect at least one of the handling or scheduling of data communicated between the UE and the NB.

EXAMPLE 2

The apparatus of example 1, the information element comprising an indication of the presence of critical data in a packet data convergence protocol (PDCP) buffer.

EXAMPLE 3

The apparatus of example 1, the information element comprising an indication of the presence of one or more critical packet data convergence protocol (PDCP) service data unit (SDU).

EXAMPLE 4

The apparatus of example 3, the circuitry to determine, based on current uplink (UL) grant allocations, that at least one of the one or more critical PDCP SDUs will be discarded, the information element comprising an indication at least one of the one or more critical PDCP SDUs will be discarded.

EXAMPLE 5

The apparatus of example 1, the information element comprising an indication that non-critical data stored preceding the critical data was discarded.

EXAMPLE 6

The apparatus of example 1, the information element comprising an indication that critical data is not present in a packet data convergence protocol (PDCP) buffer.

EXAMPLE 7

The apparatus of example 1, information element comprising an indication that the first element of a packet data convergence protocol (PDCP) buffer is critical data, that the last element of the PDCP buffer is critical data, or that the PDCP buffer contains more critical data.

EXAMPLE 8

The apparatus of example 1, the information element comprising an indication of a logical channel identification corresponding to the critical data (LCID), a logical channel group (LCG) corresponding to the critical data, a radio bearer carrying the critical data, or a flow carrying the critical data.

EXAMPLE 9

The apparatus of example 1, the information element comprising an indication of the size of the buffer in which the critical data is stored.

EXAMPLE 10

The apparatus of example 1, the information element comprising a media access control (MAC) command element (CE), a buffer status reporting (BSR) MAC CE, a data volume and power headroom report (DPR) MAC CE, or a MAC sub-header.

EXAMPLE 11

The apparatus of example 10, the information element comprising a short, a truncated or an extended MAC CE, where at least one subsequent octet comprises the indication of critical data.

EXAMPLE 12

The apparatus of example 10, the MAC CE comprising a logical channel identifier (LCID) for uplink (UL) shared channel (SCH) value to differentiate from a conventional MAC CE.

EXAMPLE 13

The apparatus of example 1, the information element comprising a packet data convergence protocol (PDCP) header, a radio link control (RLC) header, or a service data adaption protocol (SDAP) header.

EXAMPLE 14

The apparatus of example 1, the RAN a next generation radio access network (NG-RAN) cell or a long term evolution radio access network (LTE-RAN) cell.

EXAMPLE 15

A device, comprising: the apparatus of example 1; one or more application processors; radio frequency (RF) circuitry; and one or more RF antennas.

EXAMPLE 16

A method comprising: determining, at user equipment (UE), the presence of critical data; sending the information element to a node (NB) of a radio access network (RAN) to cause the NB to modify one or more settings that effect at least one of the handling or scheduling of data communicated between the UE and the NB.

EXAMPLE 17

The method of example 16, the information element comprising an indication of the presence of critical data in a packet data convergence protocol (PDCP) buffer.

EXAMPLE 18

The method of example 16, the information element comprising an indication of the presence of one or more critical packet data convergence protocol (PDCP) service data unit (SDU).

EXAMPLE 19

The method of example 18, comprising determining, based on current uplink (UL) grant allocations, that at least one of the one or more critical PDCP SDUs will be discarded, the information element comprising an indication at least one of the one or more critical PDCP SDUs will be discarded.

EXAMPLE 20

The method of example 16, the information element comprising an indication that non-critical data stored preceding the critical data was discarded.

EXAMPLE 21

The method of example 16, the information element comprising an indication that critical data is not present in a packet data convergence protocol (PDCP) buffer.

EXAMPLE 22

The method of example 16, information element comprising an indication that the first element of a packet data convergence protocol (PDCP) buffer is critical data, that the last element of the PDCP buffer is critical data, or that the PDCP buffer contains more critical data.

EXAMPLE 23

The method of example 16, the information element comprising an indication of a logical channel identification corresponding to the critical data (LCID), a logical channel group (LCG) corresponding to the critical data, a radio bearer carrying the critical data, or a flow carrying the critical data.

EXAMPLE 24

The method of example 16, the information element comprising an indication of the size of the buffer in which the critical data is stored.

EXAMPLE 25

The method of example 16, the information element comprising a media access control (MAC) command element (CE), a buffer status reporting (BSR) MAC CE, a data volume and power headroom report (DPR) MAC CE, or a MAC sub-header.

EXAMPLE 26

The method of example 25, the information element comprising a short, a truncated or an extended MAC CE, where at least one subsequent octet comprises the indication of critical data.

EXAMPLE 27

The method of example 25, the MAC CE comprising a logical channel identifier (LCID) for uplink (UL) shared channel (SCH) value to differentiate from a conventional MAC CE.

EXAMPLE 28

The method of example 16, the information element comprising a packet data convergence protocol (PDCP) header, a radio link control (RLC) header, or a service data adaption protocol (SDAP) header.

EXAMPLE 29

The method of example 16, the RAN node a node of a next generation radio access network (NG-RAN) cell or a long term evolution radio access network (LTE-RAN) cell.

EXAMPLE 30

User equipment (UE), comprising: radio frequency (RF) circuitry; and baseband circuitry coupled to the RF circuitry, the baseband circuitry to perform the method of any one of examples 16 to 29.

EXAMPLE 31

At least one computer-readable storage medium having stored thereon instructions that, when executed by processing circuitry of user equipment (UE), cause the UE to perform the method of any one of examples 16 to 29.

EXAMPLE 32

An apparatus, comprising means for performing the method of any one of examples 16 to 29.

EXAMPLE 33

User equipment (UE), comprising: radio frequency (RF) circuitry; and baseband circuitry coupled to the RF circuitry, the baseband circuitry to: determine the presence of critical data; send the information element to a node (NB) of a radio access network (RAN) to cause the NB to modify one or more settings that effect at least one of the handling or scheduling of data communicated between the UE and the NB.

EXAMPLE 34

The UE of example 33, the information element comprising an indication of the presence of critical data in a packet data convergence protocol (PDCP) buffer.

EXAMPLE 35

The UE of example 33, the information element comprising an indication of the presence of one or more critical packet data convergence protocol (PDCP) service data unit (SDU).

EXAMPLE 36

The UE of example 35, the baseband circuitry to determine, based on current uplink (UL) grant allocations, that at least one of the one or more critical PDCP SDUs will be discarded, the information element comprising an indication at least one of the one or more critical PDCP SDUs will be discarded.

EXAMPLE 37

The UE of example 33, the information element comprising an indication that non-critical data stored preceding the critical data was discarded.

EXAMPLE 38

The UE of example 33, the information element comprising an indication that critical data is not present in a packet data convergence protocol (PDCP) buffer.

EXAMPLE 39

The UE of example 33, information element comprising an indication that the first element of a packet data convergence protocol (PDCP) buffer is critical data, that the last element of the PDCP buffer is critical data, or that the PDCP buffer contains more critical data.

EXAMPLE 40

The UE of example 33, the information element comprising an indication of a logical channel identification corresponding to the critical data (LCID), a logical channel group (LCG) corresponding to the critical data, a radio bearer carrying the critical data, or a flow carrying the critical data.

EXAMPLE 41

The UE of example 33, the information element comprising an indication of the size of the buffer in which the critical data is stored.

EXAMPLE 42

The UE of example 33, the information element comprising a media access control (MAC) command element (CE), a buffer status reporting (BSR) MAC CE, a data volume and power headroom report (DPR) MAC CE, or a MAC subheader.

EXAMPLE 43

The UE of example 42, the information element comprising a short, a truncated or an extended MAC CE, where at least one subsequent octet comprises the indication of critical data.

EXAMPLE 44

The UE of example 42, the MAC CE comprising a logical channel identifier (LCID) for uplink (UL) shared channel (SCH) value to differentiate from a conventional MAC CE.

EXAMPLE 45

The UE of example 33, the information element comprising a packet data convergence protocol (PDCP) header, a radio link control (RLC) header, or a service data adaption protocol (SDAP) header.

EXAMPLE 46

The UE of example 33, the RAN node a node of a next generation radio access network (NG-RAN) cell or a long term evolution radio access network (LTE-RAN) cell.

EXAMPLE 47

An apparatus, comprising: a memory to store an information element including an indication of the presence of critical data; and circuitry for a node (NB) of a radio access network (RAN) coupled to the memory, the circuitry to: receive the information element from user equipment (UE); and modify one or more settings that effect at least one of the handling or scheduling of data communicated between the UE and the NB.

EXAMPLE 48

The apparatus of example 47, the information element comprising an indication of the presence of critical data in a packet data convergence protocol (PDCP) buffer.

EXAMPLE 49

The apparatus of example 47, the information element comprising an indication of the presence of one or more critical packet data convergence protocol (PDCP) service data unit (SDU).

EXAMPLE 50

The apparatus of example 49, the circuitry to determine, based on current uplink (UL) grant allocations, that at least one of the one or more critical PDCP SDUs will be discarded, the information element comprising an indication at least one of the one or more critical PDCP SDUs will be discarded.

EXAMPLE 52

The apparatus of example 47, the information element comprising an indication that non-critical data stored preceding the critical data was discarded.

EXAMPLE 53

The apparatus of example 47, the information element comprising an indication that critical data is not present in a packet data convergence protocol (PDCP) buffer.

EXAMPLE 54

The apparatus of example 47, information element comprising an indication that the first element of a packet data convergence protocol (PDCP) buffer is critical data, that the last element of the PDCP buffer is critical data, or that the PDCP buffer contains more critical data.

EXAMPLE 55

The apparatus of example 47, the information element comprising an indication of a logical channel identification corresponding to the critical data (LCID), a logical channel group (LCG) corresponding to the critical data, a radio hearer carrying the critical data, or a flow carrying the critical data.

EXAMPLE 56

The apparatus of example 47, the information element comprising an indication of the size of the buffer in which the critical data is stored.

EXAMPLE 57

The apparatus of example 47, the information element comprising a media access control (MAC) command element (CE), a buffer status reporting (BSR) MAC CE, a data volume and power headroom report (DPR) MAC CE, or a MAC sub-header.

EXAMPLE 58

The apparatus of example 57, the information element comprising a short, a truncated or an extended MAC CE, where at least one subsequent octet comprises the indication of critical data.

EXAMPLE 59

The apparatus of example 57, the MAC CE comprising a logical channel identifier (LCID) for uplink (UL) shared channel (SCH) value to differentiate from a conventional MAC CE.

EXAMPLE 60

The apparatus of example 47, the information element comprising a packet data convergence protocol (PDCP) header, a radio link control (RLC) header, or a service data adaption protocol (SDAP) header.

EXAMPLE 61

The apparatus of example 47, the RAN a next generation radio access network (NG-RAN) cell or a long term evolution radio access network (LTE-RAN) cell.

EXAMPLE 62

A device, comprising: the apparatus of example 47; one or more application processors; radio frequency (RF) circuitry; and one or more RF antennas.

EXAMPLE 63

A method comprising: receiving, at a node (NB) of a radio access network (RAN), an information element comprising an indication of the presence of critical data at user equipment (UE); modifying one or more settings that effect at least one of the handling or scheduling of data communicated between the UE and the NB.

EXAMPLE 64

The method of example 63, the information element comprising an indication of the presence of critical data in a packet data convergence protocol (PDCP) buffer.

EXAMPLE 65

The method of example 63, the information element comprising an indication of the presence of one or more critical packet data convergence protocol (PDCP) service data unit (SDU).

EXAMPLE 66

The method of example 65, comprising determining, based on current uplink (UL) grant allocations, that at least one of the one or more critical PDCP SDUs will be discarded, the information element comprising an indication at least one of the one or more critical PDCP SDUs will be discarded.

EXAMPLE 67

The method of example 65, the information element comprising an indication that non-critical data stored preceding the critical data was discarded.

EXAMPLE 68

The method of example 63, the information element comprising an indication that critical data is not present in a packet data convergence protocol (PDCP) buffer.

EXAMPLE 69

The method of example 63, information element comprising an indication that the first element of a packet data convergence protocol (PDCP) buffer is critical data, that the last element of the PDCP buffer is critical data, or that the PDCP buffer contains more critical data.

EXAMPLE 70

The method of example 63, the information element comprising an indication of a logical channel identification corresponding to the critical data (LCID), a logical channel group (LCG) corresponding to the critical data, a radio bearer carrying the critical data, or a flow carrying the critical data.

EXAMPLE 71

The method of example 63, the information element comprising an indication of the size of the buffer in which the critical data is stored.

EXAMPLE 72

The method of example 63, the information element comprising a media access control (MAC) command element (CE), a buffer status reporting (BSR) MAC CE, a data volume and power headroom report (DPR) MAC CE, or a MAC sub-header.

EXAMPLE 73

The method of example 72, the information element comprising a short, a truncated or an extended MAC CE, where at least one subsequent octet comprises the indication of critical data.

EXAMPLE 74

The method of example 72, the MAC CE comprising a logical channel identifier (LCID) for uplink (UL) shared channel (SCH) value to differentiate from a conventional MAC CE.

EXAMPLE 75

The method of example 63, the information element comprising a packet data convergence protocol (PDCP)

header, a radio link control (RLC) header, or a service data adaption protocol (SDAP) header.

EXAMPLE 76

The method of example 63, the RAN node a node of a next generation radio access network (NG-RAN) cell or a long term evolution radio access network (LTE-RAN) cell.

EXAMPLE 77

A node (NB) for a radio access network (RAN), comprising: radio frequency (RF) circuitry; and baseband circuitry coupled to the RF circuitry, the baseband circuitry to perform the method of any one of examples 63 to 76.

EXAMPLE 78

At least one computer-readable storage medium having stored thereon instructions that, when executed by processing circuitry of user equipment (UE), cause the UE to perform the method of any one of examples 63 to 76.

EXAMPLE 79

An apparatus, comprising means for performing the method of any one of examples 63 to 76.

EXAMPLE 80

A node (NB) for a radio access network (RAN), comprising: radio frequency (RF) circuitry; and baseband circuitry coupled to the RF circuitry, the baseband circuitry to: receive, from user equipment (UE), an information element comprising an indication of the presence of critical data at the UE; modify one or more settings that effect at least one of the handling or scheduling of data communicated between the UE and the NB.

EXAMPLE 81

The NB of example 80, the information element comprising an indication of the presence of critical data in a packet data convergence protocol (PDCP) buffer.

EXAMPLE 82

The NB of example 80, the information element comprising an indication of the presence of one or more critical packet data convergence protocol (PDCP) service data unit (SDU).

EXAMPLE 83

The NB of example 82, the baseband circuitry to determine, based on current uplink (UL) grant allocations, that at least one of the one or more critical PDCP SDUs will be discarded, the information element comprising an indication at least one of the one or more critical PDCP SDUs will be discarded.

EXAMPLE 84

The NB of example 80, the information element comprising an indication that non-critical data stored preceding the critical data was discarded.

EXAMPLE 85

The NB of example 80, the information element comprising an indication that critical data is not present in a packet data convergence protocol (PDCP) buffer.

EXAMPLE 86

The NB of example 80, information element comprising an indication that the first element of a packet data convergence protocol (PDCP) buffer is critical data, that the last element of the PDCP buffer is critical data, or that the PDCP buffer contains more critical data.

EXAMPLE 87

The NB of example 80, the information element comprising an indication of a logical channel identification corresponding to the critical data (LCID), a logical channel group (LCG) corresponding to the critical data, a radio bearer carrying the critical data, or a flow carrying the critical data.

EXAMPLE 88

The NB of example 80, the information element comprising an indication of the size of the buffer in which the critical data is stored.

EXAMPLE 89

The NB of example 80, the information element comprising a media access control (MAC) command element (CE), a buffer status reporting (BSR) MAC CE, a data volume and power headroom report (DPR) MAC CE, or a MAC sub-header.

EXAMPLE 90

The NB of example 89, the information element comprising a short, a truncated or an extended MAC CE, where at least one subsequent octet comprises the indication of critical data.

EXAMPLE 91

The NB of example 89, the MAC CE comprising a logical channel identifier (LCID) for uplink (UL) shared channel (SCH) value to differentiate from a conventional MAC CE.

EXAMPLE 92

The NB of example 80, the information element comprising a packet data convergence protocol (PDCP) header, a radio link control (RLC) header, or a service data adaption protocol (SDAP) header.

EXAMPLE 93

The NB of example 80, the RAN node a node of a next generation radio access network (NG-RAN) cell or a long term evolution radio access network (LTE-RAN) cell.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be noted that the methods described herein do not necessarily have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided merely to allow the reader to ascertain the general nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus of a user equipment (UE), comprising:
a memory; and
a processor coupled to the memory, the processor configured cause transmission of an information element including an indication of a presence of critical data to a base station of a radio access network (RAN), the information element also including an indication of a request for the base station to increase a redundancy of a subsequent uplink grant for the UE, wherein the information element comprises a service data adaption protocol (SDAP) header.

2. The apparatus of claim 1, the information element comprising an indication of the presence of critical data in a packet data convergence protocol (PDCP) buffer.

3. The apparatus of claim 1, the information element comprising an indication of a presence of one or more critical packet data convergence protocol (PDCP) service data units (SDU).

4. The apparatus of claim 3, the information element comprising that based on current upper layer an indication of a presence of uplink (UL) grant allocations to at least one of the one or more critical PDCP SDUs that is to be discarded.

5. The apparatus of claim 1, the information element comprising an indication that non-critical data stored preceding the critical data was discarded.

6. The apparatus of claim 1, the information element comprising an indication that critical data is not present in a packet data convergence protocol (PDCP) buffer.

7. The apparatus of claim 1, the information element comprising an indication that a first element of a packet data convergence protocol (PDCP) buffer is critical data, that a last element of the PDCP buffer is critical data, or that the PDCP buffer contains more critical data.

8. The apparatus of claim 1, the information element comprising an indication of a logical channel identification corresponding to the critical data (LCID), a logical channel group (LCG) corresponding to the critical data, a radio bearer carrying the critical data, or a flow carrying the critical data.

9. The apparatus of claim 1, the information element comprising an indication of a size of a buffer in which the critical data is stored.

10. The apparatus of claim 1, the information element comprising a media access control (MAC) command element (CE), a buffer status reporting (BSR) MAC CE, a data volume and power headroom report (DPR) MAC CE, or a MAC sub-header.

11. The apparatus of claim 10, the information element comprising a short, a truncated or an extended MAC CE, where at least one subsequent octet comprises the indication of the presence of critical data.

12. The apparatus of claim 10, the MAC CE comprising a logical channel identifier (LCID) for uplink (UL) shared channel (SCH) value to differentiate from a conventional MAC CE.

13. The apparatus of claim 1, the RAN a next generation radio access network (NG-RAN) cell or a long term evolution radio access network (LTE-RAN) cell.

14. An apparatus of a base station, comprising:
a memory; and
a processor coupled to the memory, the processor configured to:
receive an information element from user equipment (UE), the information element including an indication of a presence of critical data, the information element further including an indication of a request for the base station to increase a redundancy of a subsequent uplink grant, wherein the information element comprises a radio link control (RLC) header; and
in response, increase the redundancy of the subsequent uplink grant based on the information element.

15. The apparatus of claim 14, the information element comprising an indication of the presence of critical data in a packet data convergence protocol (PDCP) buffer or one or more PDCP service data units (SDU).

16. The apparatus of claim 15, the information element comprising that based on current upper layer an indication of a presence of uplink (UL) grant allocations to at least one of the one or more critical PDCP SDUs that is to be discarded.

17. The apparatus of claim 14, the information element comprising an indication that critical data is not present in a packet data convergence protocol (PDCP) buffer.

18. The apparatus of claim 14, the information element comprising an indication that a first element of a packet data convergence protocol (PDCP) buffer is critical data, that a last element of the PDCP buffer is critical data, or that the PDCP buffer contains more critical data.

19. The apparatus of claim 14, the information element comprising a media access control (MAC) command element (CE), a buffer status reporting (BSR) MAC CE, a data volume and power headroom report (DPR) MAC CE, or a MAC sub-header.

20. The apparatus of claim 19, the information element comprising a short, a truncated or an extended MAC CE, where at least one subsequent octet comprises the indication of the presence of critical data.

21. The apparatus of claim 19, the MAC CE comprising a logical channel identifier (LCID) for uplink (UL) shared channel (SCH) value to differentiate from a conventional MAC CE.

22. An apparatus of a user equipment (UE), comprising:
a memory; and
a processor coupled to the memory, the processor configured cause transmission of to send an information element including an indication of a presence of critical data to a base station of a radio access network (RAN), wherein the information element also includes an indication of a request for the base station to increase a redundancy of a subsequent uplink grant to the UE, wherein the information element comprises a radio link control (RLC) header.

23. The apparatus of claim 22, the information element comprising an indication that a first element of a packet data convergence protocol (PDCP) buffer is critical data, that a last element of the PDCP buffer is critical data, or that the PDCP buffer contains more critical data.

24. An apparatus of a base station, comprising:
a memory; and
a processor coupled to the memory, the processor configured to:
receive an information element from user equipment (UE), the information element including an indication of a presence of critical data and an indication of request to increase a redundancy of a subsequent uplink grant, wherein the information element comprises a service data adaption protocol (SDAP) header; and
in response, increase the redundancy of the subsequent uplink grant based on the information element.

25. The apparatus of claim 24, the information element comprising an indication that a first element of a packet data convergence protocol (PDCP) buffer is critical data, that a last element of the PDCP buffer is critical data, or that the PDCP buffer contains more critical data.

* * * * *